United States Patent
Jayachandran et al.

(10) Patent No.: US 12,495,190 B2
(45) Date of Patent: Dec. 9, 2025

(54) DYNAMICALLY GENERATED INTERACTIVE VIDEO CONTENT

(71) Applicant: INTERNATIONAL BUSINESS MACHINES CORPORATION, Armonk, NY (US)

(72) Inventors: Praveen Jayachandran, Bangalore (IN); Mathews Thomas, Flower Mound, TX (US); Dushyant K. Behl, Bangalore (IN); Mudit Verma, New Delhi (IN); Utpal Mangla, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 17/736,348

(22) Filed: May 4, 2022

(65) Prior Publication Data

US 2023/0362460 A1    Nov. 9, 2023

(51) Int. Cl.
*H04N 7/10* (2006.01)
*G06V 20/40* (2022.01)
(Continued)

(52) U.S. Cl.
CPC ......... *H04N 21/8545* (2013.01); *G06V 20/40* (2022.01); *G11B 27/036* (2013.01);
(Continued)

(58) Field of Classification Search
CPC ......... H04N 21/8545; H04N 21/23106; H04N 21/2393; H04N 21/251; H04N 21/25891;
(Continued)

(56) References Cited

U.S. PATENT DOCUMENTS

| 11,057,652 B1 | 7/2021 | Gauny |
| 2009/0083010 A1* | 3/2009 | Qi ........................... G06V 20/40 703/2 |

(Continued)

OTHER PUBLICATIONS

"Amazon Interactive Video Service", Amazon, downloaded from the internet on Apr. 6, 2022, 11 pages, <https://aws.amazon.com/ivs/>.

(Continued)

*Primary Examiner* — Annan Q Shang
(74) *Attorney, Agent, or Firm* — Monchai Chuaychoo

(57) ABSTRACT

Systems, methods and/or computer program products for dynamically generating interactive content at an edge node of an edge network. For each set of video frames received, altered frames cached by the edge network can be fetched (when available) and reused to deliver interactive content to users. Where cached content is not present or distinctly different content from previously delivered content is intended for delivery to user(s), edge node identifies hot-spots within video frames to insert interactive content, defining a timing and location for insertion, selects content consistent with user insights and/or preferences as well as an interaction types and placements known to be preferred by the user requesting the video frames. The edge node uses video creation services to alter the incoming video frames into altered video frames, inserts selected content at corresponding hotspots within the video and applies the interaction types for presenting the content to the user.

20 Claims, 17 Drawing Sheets

(51) Int. Cl.
| | |
|---|---|
| *G11B 27/036* | (2006.01) |
| *G11B 27/34* | (2006.01) |
| *H04N 21/231* | (2011.01) |
| *H04N 21/239* | (2011.01) |
| *H04N 21/25* | (2011.01) |
| *H04N 21/258* | (2011.01) |
| *H04N 21/8545* | (2011.01) |

(52) U.S. Cl.
CPC ....... *G11B 27/34* (2013.01); *H04N 21/23106* (2013.01); *H04N 21/2393* (2013.01); *H04N 21/251* (2013.01); *H04N 21/25891* (2013.01)

(58) Field of Classification Search
CPC .... H04N 21/812; G06V 20/40; G11B 27/036; G11B 27/34
See application file for complete search history.

(56) References Cited

U.S. PATENT DOCUMENTS

| | | | | |
|---|---|---|---|---|
| 2018/0164990 | A1* | 6/2018 | Lin | G06Q 50/01 |
| 2018/0176614 | A1* | 6/2018 | Lin | G11B 27/031 |
| 2019/0014164 | A1* | 1/2019 | Hardy | H04L 65/60 |
| 2020/0213644 | A1 | 7/2020 | Gupta | |
| 2020/0228880 | A1 | 7/2020 | Iyer | |
| 2020/0311476 | A1* | 10/2020 | Han | G06F 18/217 |
| 2020/0314465 | A1 | 10/2020 | Iyer | |
| 2022/0053171 | A1* | 2/2022 | Naphade | G08B 13/19673 |
| 2022/0201535 | A1* | 6/2022 | Chay | H04W 74/0816 |
| 2022/0201555 | A1* | 6/2022 | Zeng | H04W 28/20 |
| 2023/0091348 | A1* | 3/2023 | Lee | H04N 19/46 348/43 |
| 2024/0292041 | A1* | 8/2024 | Hinds | G06N 3/0464 |

OTHER PUBLICATIONS

"Cloud-based Interactive Video Platform", Rapt Media, downloaded from the internet on Apr. 6, 2022, 7 pages, <http://www.raptmedia.com/product/>.
"Create Interactive Videos", Wirewax, downloaded from the internet on Apr. 6, 2022, 17 pages, <https://www.wirewax.com/>.
"Home—Mirriad in-content advertising", Mirriad, downloaded from the internet on Apr. 6, 2022, 10 pages, <https://www.mirriad.com/>.
"Interactive Video Tutorial", H5P, downloaded from the internet on Apr. 6, 2022, 37 pages, <https://h5p.org/tutorial-interactive-video>.
Bilal et al., "Edge Computing for Interactive Media and Video Streaming", 2017 Second International Conference on Fog and Mobile Edge Computing (FMEC), May 2017, DOI: 10.1109/FMEC.2017.7946410, 7 pages.
Joubel, "Interactive video", H5P, Jun. 10, 2013, 2 pages, <https://h5p.org/interactive-video>.
Mell et al., "The NIST Definition of Cloud Computing", Recommendations of the National Institute of Standards and Technology, Special Publication 800-145, Sep. 2011, 7 pages.
Vyond Team, "Interactive Video: 69 of the Best Examples", Vyond, Feb. 3, 2020, 33 pages, <https://www.vyond.com/resources/interactive-video-examples/>.

* cited by examiner

```
                                                    631b
    {
    ┌ "start_time" : <min:sec>,
    │ "end_time" : <min:sec>,
703 ┤ "location" : <location in frames>,
    └ "concept" : "Newton's laws of motion",
    }
```

FIG. 9B

```
                                                    633b
    {
    ┌ "start_time" : <min:sec>,
    │ "end_time" : <min:sec>,
703 ┤ "location" : <location in frames>,
    └ "concept" : "Newton's laws of motion",
705 → "content" : [{
              "type" : "Website",
              "link" : <website_URL>
            },
            {
              "type" : "Video",
              "link" : <video_URL>,
            }]
    }
```

FIG. 9C

```
                                                    635b
{
    ┌ "start_time" : <min:sec>,
    │ "end_time" : <min:sec>,
703 ┤ "location" : <location in frames>,
    └ "concept" : "Newton's laws of motion",
705 ─→"content" : [{
                    "type" : "Website",
                    "link" : <website_URL>
                  },
                  {
                    "type" : "Video",
                    "link" : <video_URL>,
                  }]
    "interation" : [{
                    "type" : "website_link",
                    "highlight" : <image>,
                    "image_location" : <directory>
                  },
                  {
                    "type" : "Video",
                    "optional" : "Yes"
                  }]
}
```

FIG. 9D

```
                                                 631c
┌────────────────────────────────────┐
│  {                                 │
│    ┌ "start_time" : <min:sec>,     │
│    │ "end_time" : <min:sec>,       │
│  703│ "location" : <location in frames>, │
│    └ "object_desc" : "vehicle",    │
│  }                                 │
└────────────────────────────────────┘
```

FIG. 10B

```
                                                 633c
┌────────────────────────────────────┐
│  {                                 │
│    ┌ "start_time" : <min:sec>,     │
│    │ "end_time" : <min:sec>,       │
│  703│ "location" : <location in frames>, │
│    └ "object_desc" : "vehicle",    │
│  705──►"content" : [{              │
│              "type" : "Video",     │
│              "link" : <video>,     │
│         },                         │
│         {                          │
│              "type" : "annotation" │
│              "data" : {"name" : "yyy", ID : "zzz"} │
│         }]                         │
│  }                                 │
└────────────────────────────────────┘
```

FIG. 10C

```
{
    ┌ "start_time" : <min:sec>,
    │ "end_time" : <min:sec>,
703┤ "location" : <location in frames>,
    └ "object_desc" : "vehicle",
705──▶"content" : [{
                "type" : "Video",
                "link" : <video>,
            },
            {
                "type" : "annotation"
                "data" : {"name" : "yyy", ID : "zzz"}
            }]
707──▶"interaction" : {
                "type" : "video",
                "optional" : "No"
            }
}
```

FIG. 10D

DYNAMICALLY GENERATED INTERACTIVE VIDEO CONTENT

BACKGROUND

The present disclosure relates generally to the field of customized video content generation, and more specifically turning non-interactive video into interactive video by altering video frames at the edge of a cloud network and delivering the customized video content from the edge network to the end-user.

Edge computing is the deployment of computing and storage resources at the location where data is produced. Edge computing network topology ideally places computing and storage at the same point as the data source at the network edge. Rather than transmitting raw data to a central data center for processing and analysis, that work is instead performed where the data is generated. The result of shifting networking closer to the data source, reduces bandwidth use and latency because fewer processes are running in the cloud. Instead, the processes can be moved to local computing systems, such as on a user's computer, to an internet-of-things (IOT) device, or an edge server. The edge of the network is geographically close to the device. For devices that may connect to the internet, a network edge may refer to where the device or the local network containing the internet-connected device communicates with the internet. Bringing the computation and data storage to the network's edge minimizes the amount of long-distance communication must happen between a client and server, while still being able to send results from data processing at the edge can be sent back to a data center for human review, archiving and merging with other data results for broader analytics as needed.

Edge caching and Content Delivery Networks (CDN) can play a critical role in over-the-top (OTT) distribution of content. They can make geographical delivery possible by staging data closer to user devices, while reducing the workload on origin servers and long-haul networks, giving network users access to content in an efficient manner with reduced response times. Edge caching can be defined as the intermediate storage of data from an initial data source (i.e., an origin server) for consumption by devices of the network that are further from the data source. Data can be fetched by the edge cache from an origin server and subsequently, nearby devices within the network topology can fetch content from the edge cache. Within a CDN, an edge cache can serve one or more CDN endpoints, which can in turn serve many devices. For example, serving content web pages, operating system updates and/or live streaming content. Using an edge cache as an intermediate storage point on the network means that the data does not have to be sent to back-end processing systems such as on public clouds. Instead, the data can be processed much quicker, or even immediately on the edge device.

SUMMARY

Embodiments of the present disclosure relate to a computer-implemented method, an associated computer system and computer program products for dynamically generating interactive video content at an edge node of an edge network. The computer-implemented method comprises receiving, by a processor of the edge node, an incoming set of video frames; identifying, by the processor, one or more hotspots within the incoming video frames to insert the interactive content, wherein each of the one or more hotspots are defined within a set of instructions including a timing within the incoming video frames and location within the incoming frames for inserting the interactive content; selecting, by the processor, content from a repository configured to be inserted within the incoming video frames at each of the one or more hotspots defined by the set of instructions, wherein the content from selected from the repository is defined within the set of instructions; selecting, by the processor, an interaction type defining within the set of instructions how the content is shown at each of the one or more hotspots; executing, by the processor the set of instructions, altering the incoming video frames to an altered set of video frames containing the content selected that is configured to be presented to a user at each of the one or more hotspots using the interaction type defined within the set of instructions; caching, by the processor, the altered video frames to an interactive content cache of the edge network; and outputting, by the processor the altered video frames to an end user device placed in communication with the edge network.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

FIG. 9B illustrates an embodiment of a portion of code depicting an example of instructions for identifying a hotspot for altering frames of a video using the content generation system of FIG. 9A, said instructions defining when and where educational and/or supplemental material of interactive content will occur within the altered video frames.

FIG. 9C illustrates an embodiment of an additional portion of code added to the portion of code depicted in FIG. 9B, wherein the additional portion of code depicts an example of instructions selecting the type of educational and/or supplemental content being introduced into the altered frames of the video at each corresponding hotspot defined in the code of FIG. 9B.

FIG. 9D illustrates an embodiment of an additional portion of code added to the portion of code depicted in FIG. 9C, wherein the additional portion of code depicts an example of instructions selecting the interaction type and placement within the altered video frames, and said instructions define how the selected type of educational and/or supplemental content is shown to the user for each interaction type selected.

FIG. 10B illustrates an embodiment of a portion of code depicting an example of instructions for identifying a hotspot for altering frames of a video using the content generation system of FIG. 10A, said instructions defining when and where interactive content for inserting interactive content for tracking an object and/or person will occur within the altered video frames.

FIG. 10C illustrates an embodiment of an additional portion of code added to the portion of code depicted in FIG. 10B, wherein the additional portion of code depicts an example of instructions selecting the type of tracking content being introduced into the altered frames of the video at each corresponding hotspot defined in the code of FIG. 10B.

FIG. 10D illustrates an embodiment of an additional portion of code added to the portion of code depicted in FIG. 10C, wherein the additional portion of code depicts an example of instructions selecting the interaction type and placement within the altered video frames, and said instructions define how the selected type of tracking content is shown to the user for each interaction type selected.

DETAILED DESCRIPTION

Figure 1:
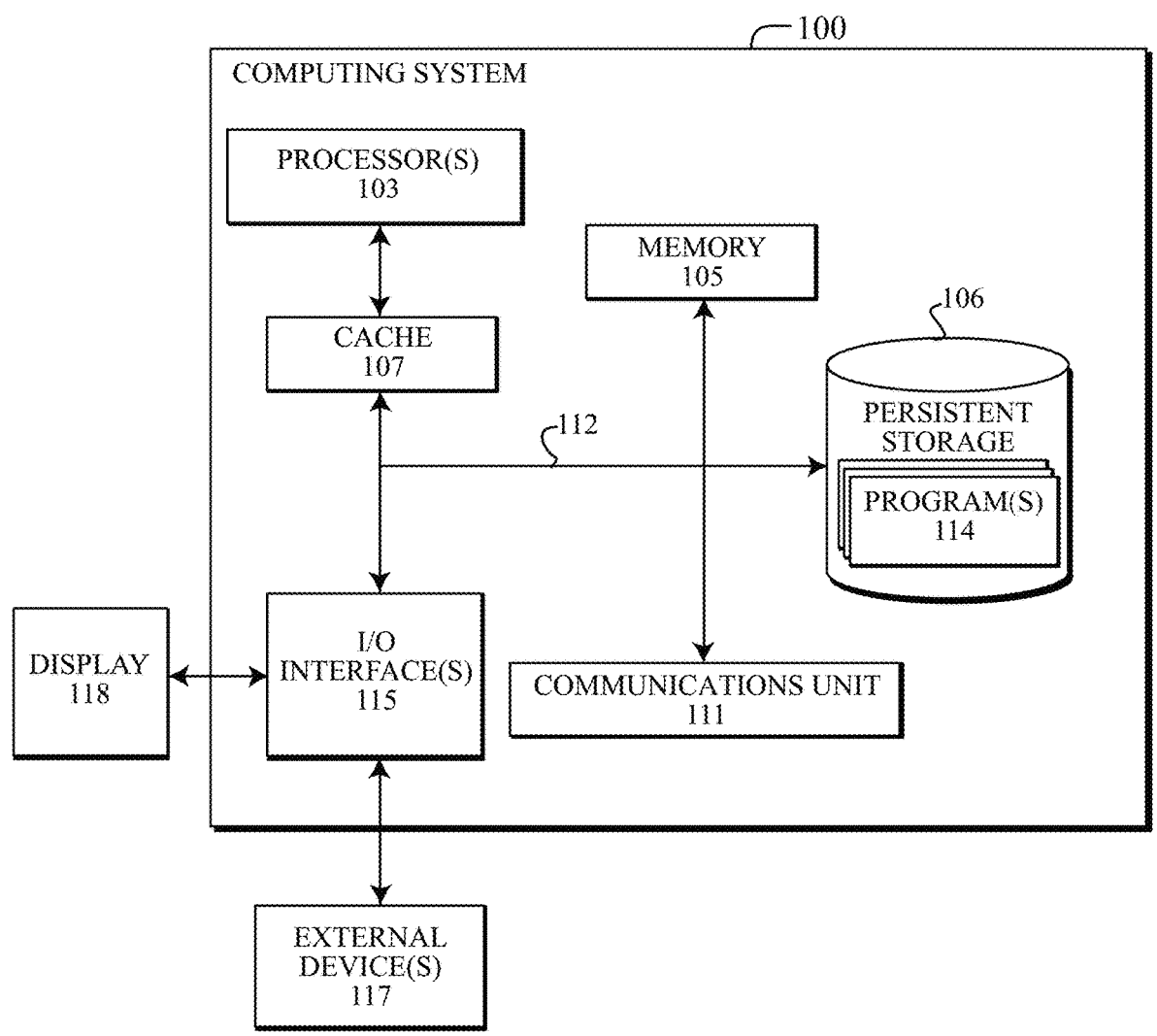
FIG. 1 depicts a block diagram illustrating an embodiment of a computing system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

OVERVIEW

Video delivery platforms are becoming more widely adopted by consumers, especially as more over-the-top (OTT) video services become more available over the Internet, expanding the number of customers subscribing to the services. OTT video services are being integrated as a feature for content distribution in many different industries, including entertainment, advertising, education, healthcare, gaming, augmented reality (AR) and virtual reality (VR) services and surveillance. As OTT video platforms expand and change over time, interactive video, which blends traditional linear video with opportunities for user interactions has developed quickly to integrate text, hyperlinks, chat boxes, popups, polls and other interactive elements that are inserted at specific times and locations of the linear videos. However, existing types of interactive video are not dynamically created. Instead, limited numbers of interactive elements are statically programmed by the video content developer at specified placement points of the videos and inserted by the developer before the content is uploaded to an OTT service provider. In some instances, such is the case with advertisement placement, the advertisements may be added to the developer's video content. However, the advertising placement is added at the backend of the cloud server, by the service provider delivering the content to the end user before video streaming occurs. The inserted content is not customized to a specific user requesting the video, since the advertisements are statically placed ahead of time, and many different users may receive the same advertisement in the pre-selected place for the video content being served. For example, an OTT service such as a video streaming service may pre-program all content being delivered to insert a random advertisement from a database of available ads at 15-minute intervals on the backend at the cloud, for every video requested or content that is streamed to the end user. The advertisement content is also not related to or derived from the content of the video itself, causing a break in the viewing experience of the end user rather than being seamlessly embedded into the content of the video.

Embodiments of the present disclosure recognize that limited data bandwidth and difficulty by service providers to assure a low latency, low jitter experience for interactive content, has resulted in limited adoption and development of interactive video content delivery. Embodiments of the present disclosure leverage the use of edge cloud networks to dynamically generate, cache and deliver interactive video content that is customized based on individual consumer preferences and insights, enabling video services and other content providers to insert customizable interactive content after a video is requested by a user, without relying on the video's developer to make changes to the content or the backend of the cloud server to pre-insert the interactive content. Instead of delivering video content configured with statically inserted content, embodiments of the present disclosure can alter video frames of requested content at a position within the network between the cloud server or data center and the requesting user's network, at a node of an edge cloud network. For example, at a node of a multi-access edge cloud (MEC) and/or radio access network (RAN), which is closer to the where the user receives the content at the end user's device, resulting in low latency content delivery and low jitter experience.

The generation and caching of interactive content at the edge network can be performed by altering video frames of requested videos previously uploaded or streamed by content developers to the cloud service or data center. A user accessing the cloud services of an OTT video provider can request a particular video or live video stream. The video frames for the requested video or live stream can be received at the edge network and pre-processed to determine whether or not the requested video frames have been previously altered with interactive content and cached by the node of the edge network, or other sites of the edge network. A cache used for storing interactive content can be searched and if interactive content has been created for the video frames requested, the cached interactive content can be applied again to the requested frames and delivered as an altered video to the requesting user. However, in some instances, where cached video frames for the requested video are unable to be fetched from the cache and/or the intent is not to repeatedly use interactive content, for example by avoiding the deliverance of the same interactive content to the same user again or to avoid delivering the same content to different users, new interactive content can be generated and applied to the requested video frames.

Embodiments of the content generation system generating and caching interactive content at the edge node can apply a process that creates code or an executable script containing instructions that can be applied to alter the requested video frames. Embodiments may begin by identifying portions of the existing video frames that may be suitable for receiving the insertion of interactive content. This process may be referred to as "hotspot identification". Consumer insights and/or consumer preferences that may be known, statically configured and/or learned about the requesting user over time as the user has interacted or made choices using interactive content, may be used to customize the optimal timing, placement, type of content and/or type of interactions to use when altering the video frames. During the hotspot identification process, the edge node generating the interactive content can use known or predicted information about the requesting user to optimize the selection timing for when interactive content will be shown to the user (i.e., the timing within the video frames) and where the interactive content will appear (i.e., the location within the frames). For example, using object detection to detect objects known to appeal to the requesting user and set the timing of the interactive content to display while the detected object is visible within the video frames.

Once the timing and location for triggering the interactive content is identified and written to the code or script for altering the video frames, instructions for content selection can be generated and added to the code or script as well. During content selection, the code or script can be written to define the type of content being shown to the user during the identified hotspot. The content selection can be made based on existing consumer insights and/or preferences of the user and the type of content being shown may be selected from a repository of available content, such a private database or publicly available data. For example, the content being displayed an advertisement, a web page, a video, an image, text and/or any other type of digital asset or visual element that may be inserted into the video frames being altered. Moreover, the type of interaction and how the content is shown to the user during the user's interaction with the interactive content at each identified hotspot may be further added as instructions within the code or script. For instance, the edge node can, based on the insights and preferences of the user, select a type of interaction that may be known to be preferred or result in user interaction with the content. For example, selecting an interaction type that may present the content as a mandatory or optional video, a popup presents content that provides additional supplemental information, an in-video poll or chat box, etc.

Once the code or script defines the hotspot location, the content being shown at the hotspot and the type of interaction being used to present the content, the code or script providing the instructions for altering the requested video frames can be packaged for execution. For example, as an SDK, API or any other type of executable format for applying the code by a video creation service, whereby the code or script is executed, dynamically altering the video frames as specified by the code or script. The altered video frames being outputted by the video creation service of the edge node can cache the altered video frames to the cache memory at the edge network, and transmit the set of requested video frames, which now include the altered comprising the interactive content to the end user device of the requesting user.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of a desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
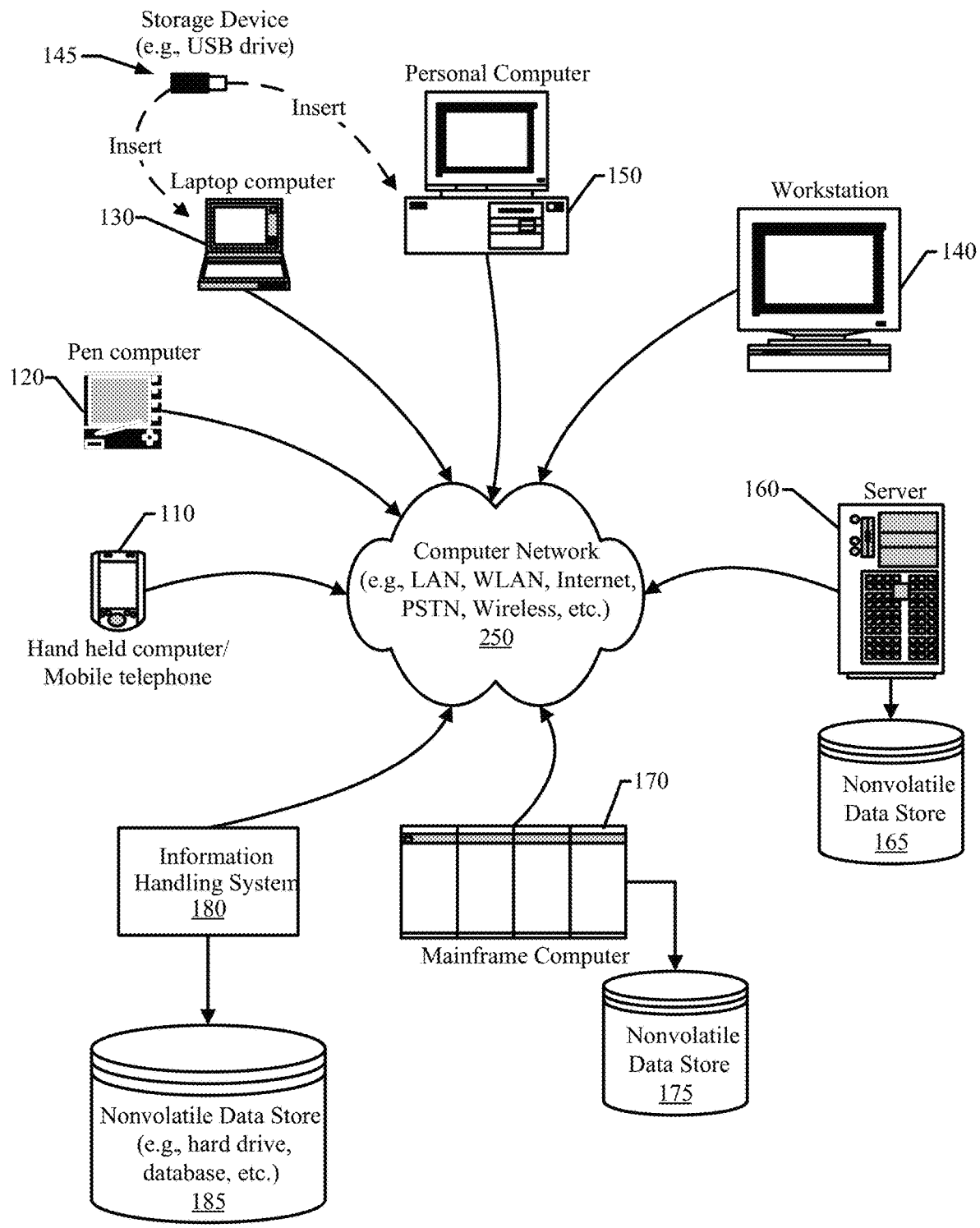
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
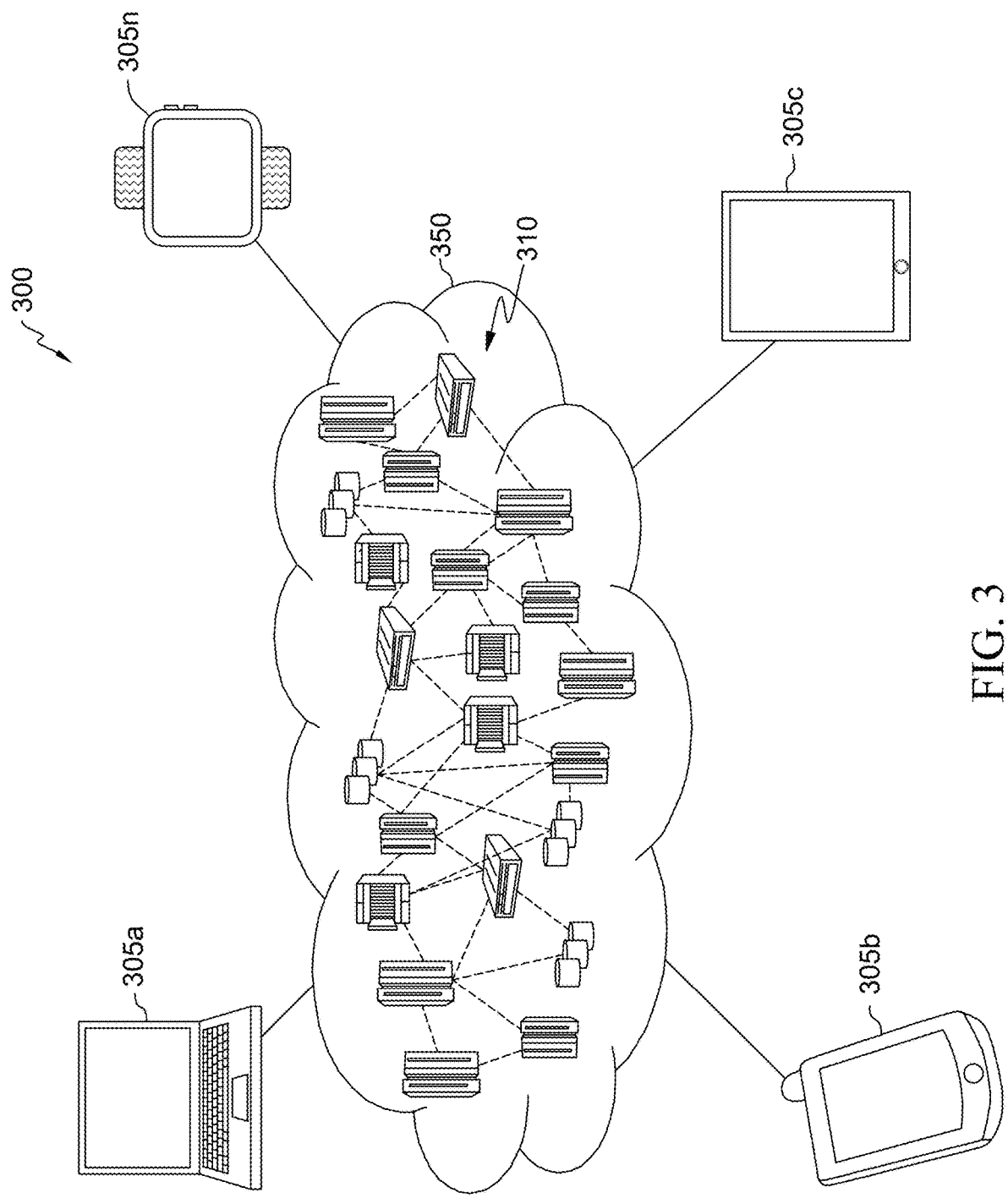
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n, smart glasses, sensors, or other IoT devices. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
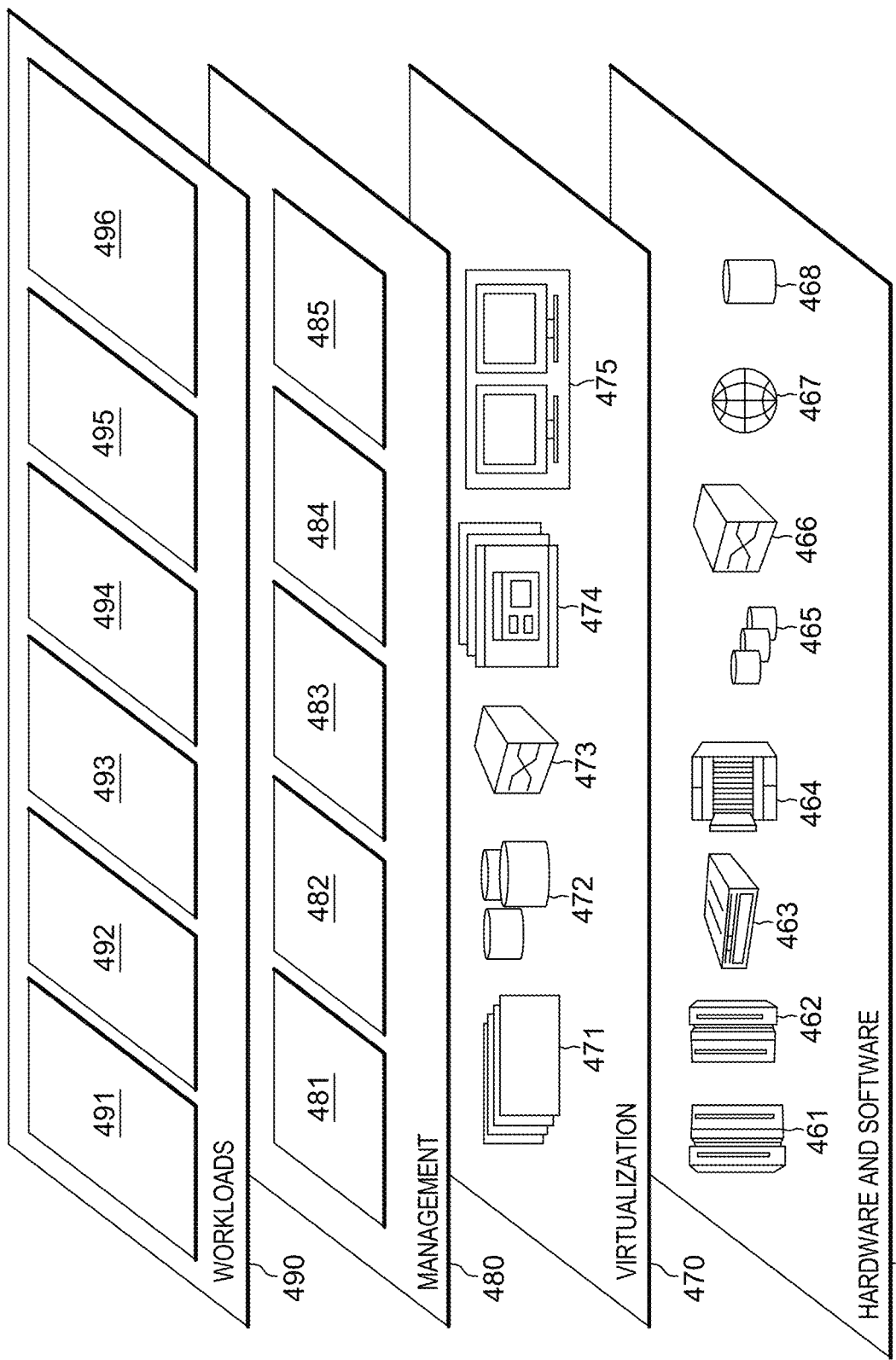
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; video conferencing 495 and video streaming services 496. System for Dynamically Generating Interactive Video Content at the Edge Cloud It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
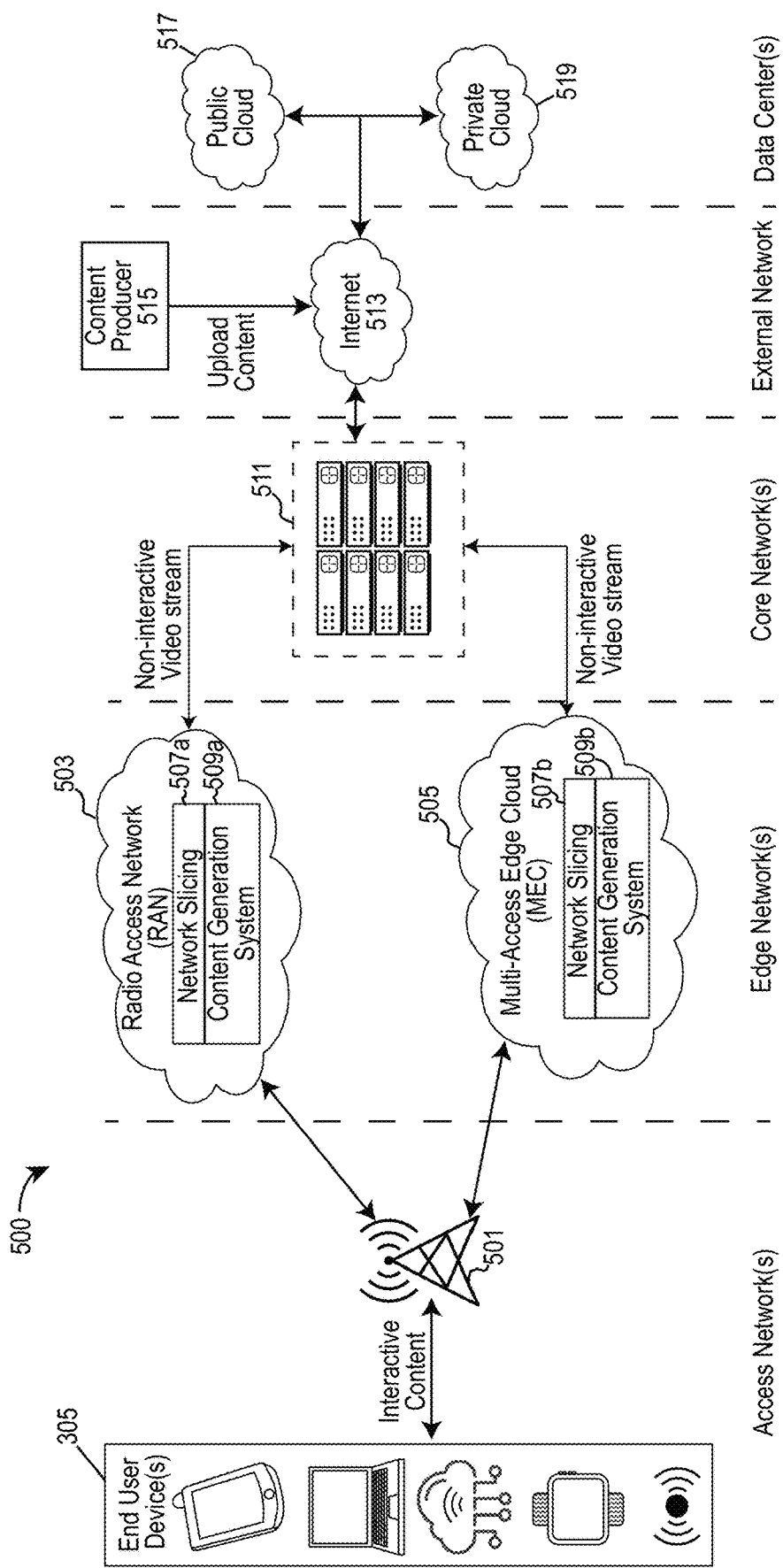
FIG. 5 depicts a functional block diagram describing an embodiment of a computing environment for dynamically generating, caching and/or serving interactive video content by an edge network, in accordance with the present disclosure.

Referring to the drawings, FIG. 5 depicts an embodiment of a computing environment 500 illustrating a high-level overview of interconnecting computing networks extending from a cloud service provider's data center(s) to the access network(s) where the end user device(s) 305 is locally connected to access content and services made available to users by the cloud service provider. As depicted by the computing environment 500, data center(s) may comprise one or more public clouds 517 and/or private clouds 519 (referred together generally as "cloud 517, 519"). One or more external networks, such as the globally-accessible Internet 513, may connect the cloud 517, 519 to one or more core network(s) 511 placed in communication with an edge network servicing a plurality of end users. A core network(s) 511 may refer to a portion of the overall computing network that interconnects different portions of the network to the access network serving end user devices, as well as operate as a gateway to one or more external networks or subnetworks. Embodiments of the core networks 511 may comprise highspeed wired and/or wireless connections. For example, the core network may include wired communication elements connected by highspeed communication lines such as fiber optic lines, high speed cables and/or telephone lines. In other examples, the core network 511 may include point-point radio communication links using radio towers, cellular towers, satellite communication links etc. For instance, when data is being carried over a mobile device network, such as a 4G, LTE or 5G network, the core network 511 may be a packet core such as a GPRS core network (or equivalent thereof), an evolved packet core (i.e., an SAE core), or other type of core network responsible for transmitting data, voice and video to mobile devices.

As depicted in FIG. 5, core network(s) 511 may carry non-interactive video streams, video frames and/or other types of data requested by end users, over large geographical regions to the end user device 305 requesting the data. For instance, video stream data can be carried from an external network such as the Internet 513 to computing nodes distributed at the network's edge (i.e., edge network 503, 505). Edge network(s) 503, 505 may refer to a location at the edge of the core networks 511 whereby computing nodes (referred to herein as "edge nodes") of the network may reside. Embodiments of the edge networks 503, 505 may be physical or virtualized environments where data can be collected and may include hardware that exists outside of the datacenter(s) to provide applications and services to end users. In other words, the edge network(s) 503, 505 may be considered to be moving a portion of the data storage and computing resources out of the datacenter(s) and closer to the sources of data themselves, i.e., the end user devices 305. Embodiments of the edge network(s) 503, 505 may include a plurality of decentralized edge nodes that are deployed at the network edge and provisioned computing and storage resources, while in close proximity to the local access networks wherein the end user device(s) 305 may be connected.

Embodiments of an edge network 503, 505 may vary depending on the kind and type of core network 511 being utilized to deliver data and content to the end-user. FIG. 5 depicts an example of two different types of edge networks 503, 505 that may be implemented at the edge of a core network 511 to alter non-interactive video streams and/or non-interactive video frames requested by an end user device 305 into interactive video frames comprising altered video frames that include additional content therein. In the exemplary embodiment of FIG. 5, the edge network is depicted as a radio access network (RAN) 503 and/or a multi-access edge cloud (MEC) 505 placed in communication with a base-station 501 or other communication gateway of the access network upon which one or more end-user devices 305 are connected.

A RAN 503 may be part of a mobile network that connects the end user devices 305 to the cloud 517, 519. The RAN 503 at the network's edge facilitates communication with the end user device 305 via radio waves from the end user device 305 to a transceiver of the RAN 503, then from the RAN's transceiver to the core network 511 which can connect to the global Internet 513. In some embodiments of RAN 503, network functions of the RAN 503 may be virtualized. A virtualized RAN (vRAN) may allow a network operator to run baseband functions as software without requiring special proprietary hardware that may be part of a standard RAN. A vRAN can be achieved by applying principles of virtualization to RAN 503 and may be part of a larger scheme of network function virtualization (NFV) which may virtualize network services such as routers, firewalls, load balancers and other components of the network.

In some embodiments of computing environment 500, the edge network 503, 505 may be an MEC 505. An MEC 505 may refer to a type of network architecture that provides cloud computing capabilities and/or a service environment at the edge of the core network 511 rather than at the centralized core of infrastructures at the underlying cloud 517, 519. By performing computing capabilities and/or services at the edge of the network, the MEC 505 can reduce latency, ensure highly efficient network operations and service delivery. MEC 505 can host applications away from the centralized data center(s), closer to the end users and the data that is created by the applications utilized by end users. MEC 505 can be characterized by ultra-low latency, high bandwidth and real-time access to radio network information that can be leveraged by the applications being hosted by MEC 505. Embodiments of MEC 505 can deploy interactive content generating services and caching at the network edge, serving nearby access networks more efficiently and alleviating core networks 511 from network congestion.

The edge network(s) 503, 505, whether a RAN 503, MEC 505 and/or a combination of available network architectures thereof accessible to the access network, may manage and support one or more applications or services that may provide video content and streaming video to end user device 305 using network slicing 507a, 507b (referred to herein generally as "network slicing 507"). Network slicing 507 may be defined as a configuration that allows multiple virtualized and independent networks to be created on top of an underlying physical infrastructure. Each "slice" or portion of the virtualized network can be allocated resources based on the needs of the application, use case or customer(s). Applicants or services that need greater bandwidth to deliver interactive content to end user devices 305 can be individually managed to meet the individual requirements of each application or service. A software-defined network (SDN) using network slicing 507 can manage traffic flows through an application programming interface (API) using a central control plane and configure resources to deliver the application(s) service(s) of the edge network 503, 505 to the end user through an application layer, while the network slice controller orchestrates and maps services and/or monitors functionality between the layers of the SDN.

Content generation system 509a, 509b (referred to herein generally as content generation system 509) may be deployed at one or more edge nodes of the edge network 503, 505 as shown in FIG. 5. Content generation system 509 can perform functions and tasks to dynamically generate interactive content as applications and/or services of the network conduct operations to stream or transmit video content to end user devices 305. Embodiments of the content generation system 509 can generate interactive content across multiple channels of the network to provide a consistent user experience across different applications or services. For instance, by remembering user preferences, and insights across a plurality of services or applications, as well as ensuring that interactive content previously distributed to various users to is not repeated and/or repeated too often. For example, a user may utilize a plurality of OTT video services or streaming applications to view different video content from various cloud providers utilizing the content generation system 509 at the edge network 503, 505. If the content generation system 509 is responsible for serving advertisements to the same user for each of the OTT video services or applications, the content generation system 509 can recognize the same user across multiple OTT platforms and ensure that the same user is not having interactive content repeated, for instance by inserting different advertisements as interactive content for the user even as the user requests video content or streams videos using different applications. A deployment of the content generation system 509 to an edge network 503, 505 and/or edge node may operate in conjunction with network slicing 507 to provide interactive video content across multiple slices of the network. The content generation system 509 can may act as a centralized point within the edge network 503, 505 receiving video frames on behalf of the plurality of applications or services operating within separate network slices, and outputting interactive video content as altered frames of the incoming video frames or streaming video frames to end user devices 305 running a particular application or service operating within the network slice.

Figure 6:
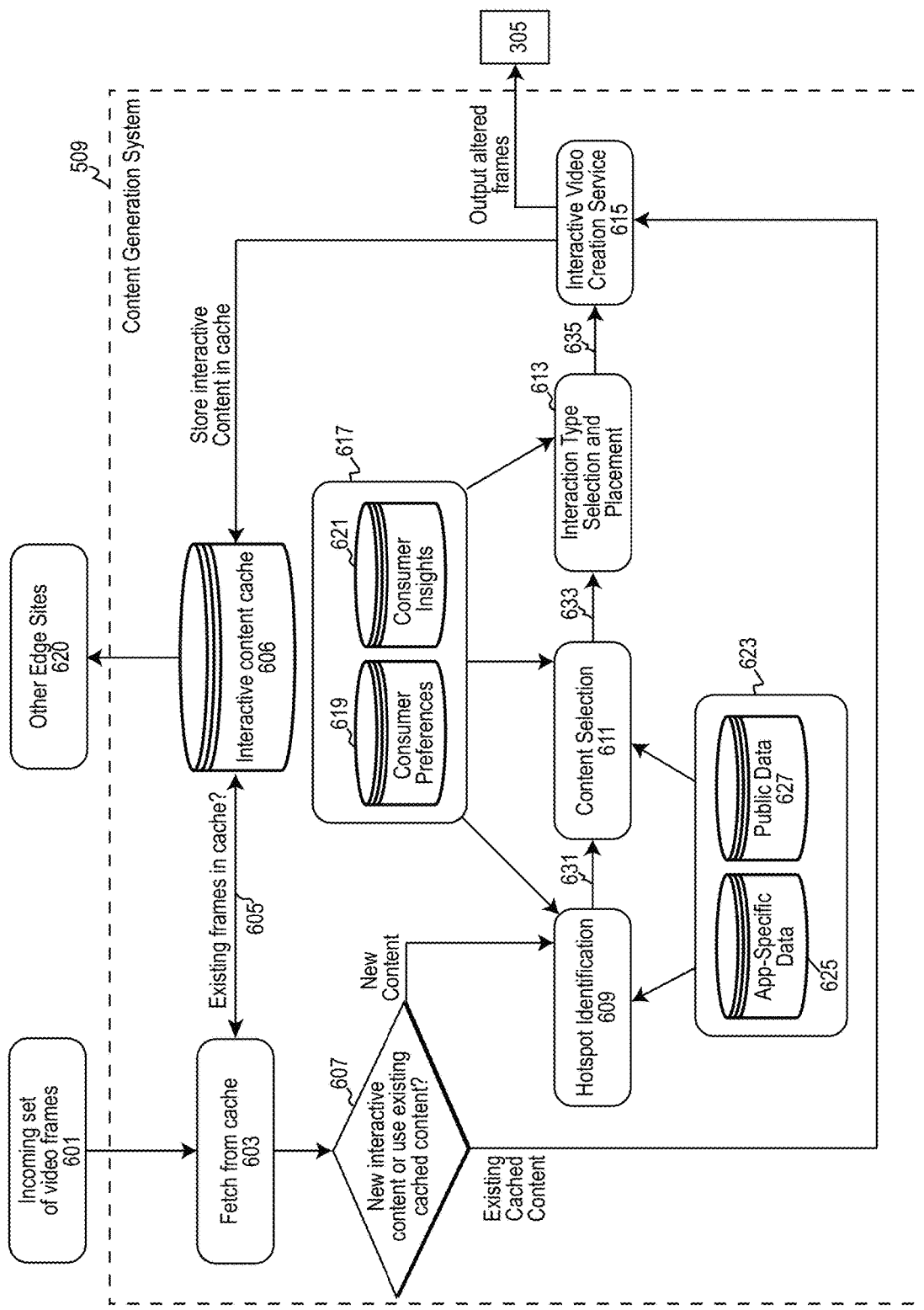
FIG. 6 depicts a block diagram describing an embodiment of a content generation system of an edge node of a network, including an embodiment of a workflow for generating and caching interactive content by altering a set of video frames in accordance with the present disclosure.

FIG. 6 illustrates an exemplary an embodiment of the system architecture of a content generating system 509. Content generation system 509 may be deployed by one or more nodes of the edge network 503, 505 to generate customized interactive video content close to the edge of a network. As shown in FIG. 6, the system architecture of the content generating system 509 may include an interactive content cache 606, user analytics 617 which may comprise one or more repositories including consumer insights 621 and/or consumer preferences 619, repositories 623 containing application-specific data 625 and/or public data 627, as well as one or more services performing hotspot identification 609, content selection 611, interaction type selection/placement 613 and/or interactive video creation 615. As shown, content generation system 509 may receive incoming set(s) of video frames 601 in response to user requests for non-interactive content from one or more clouds 517, 519. The incoming content may include non-interactive, linear video, or video streams containing non-interactive video frames.

Embodiments of the content generation system 509 may include an interactive content cache 606. The interactive content cache 606 may store altered versions of the incoming sets of video frames 601, which have been generated to include interactive content which may have been previously customized to a user's preferences. Once cached, content generation system 509 may serve the altered frames in response to subsequent user requests for the same incoming set of video frames and/or provide the altered frames to other edge sites 620 of the edge network 503, 505; fulfilling requests to apply interactive content to the same video frames used to create the cached altered frames. As shown in FIG. 6, upon receiving an incoming set of video frames 601, the content generation system 509 may run a fetching service 603 to query 605 the interactive content cache 606 for existing set(s) of altered video frames previously generated and stored within the cache that match the incoming set of video frames 601.

Upon receiving the results from the query 605, the content generation system can determine at decision point 607 whether or not to re-use the existing cached content to create the same interactive content previously outputted by the content generation system 509 or generate a new set of interactive content in response to the user request for the incoming set of video frames 601. If the query 605 of the fetching service 603 does not find corresponding interactive content matching the incoming set of video frames 601 cached by the interactive content cache 606 and/or there is an intent by content generation system 509 not to reuse the altered video frames that were previously cached, then new content can be generated by the content generation system 509. With regard to not re-using content, such a decision may be made, for example, if the user making the request for the incoming frames 601 previously received interactive video content comprising the altered video frames cached by the interactive content cache 606 recently. The content generation system may determine that reusing the same cached content again would be too repetitive and instead generate new content for the requesting user to keep users from receiving the same content over again.

The hotspot identification service 609 (referred to herein as "hotspot identification 609") may perform tasks or functions of the content generation system 509 directed toward identifying one or more timestamps or periods of time within the incoming set of video frames 601 as well as a locational position within the frame during the identified period of time to alter video frames with interactive content. In other words, "hotspot" may refer to the "when and where" insertion of the interactive content may be considered desirable, effective and/or optimal for the requesting user. Determining the hotspots for the incoming set of video frames may vary from user to user and may be customized to each user be based on the requesting user's known consumer insights 621 and/or consumer preferences 619, as well as the content of the incoming set of video frames 601. In some embodiments, hotspot identification 609 may use object detection and/or concept detection to identify hotspots within the set of video frames. For example, hotspot identification 609 may pre-process the incoming set of video frames 601 by looking for objects or discussions of concepts relating to the interests of the user, and upon finding the object or concepts, set a hotspot within the set of video frames 601 for insertion of interactive content that may be related to the object or concept. For instance, upon running an object detection algorithm on the incoming set of video frames 601, the hotspot identification 609 may identify an object such as the beach within the video frames and set the hotspot at the introduction of the beach within the video frames for insertion of a corresponding advertisement. For instance, an advertisement for air travel, hotel, surfboards, vacation packages, etc.

Figure 7A:
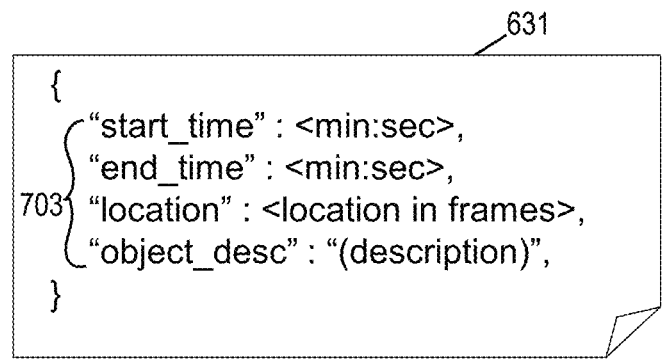
FIG. 7A illustrates an embodiment of a portion of code depicting an example of instructions for identifying a hotspot for altering frames of a video, defining when and where the alteration to the frames occurs, in accordance with the present disclosure.

FIG. 7A depicts an example of a portion of code 631 comprising instructions for identifying a hotspot location within an incoming set of video frames 601. As shown in the example, the hotspot instruction 703 can include the timing as defined by the start time and end time. A location within the frame may also be included within the hotspot instruction defining the position within the frame for introducing the interactive content. For example, a set of coordinates may be used or descriptive instructions describing the position of content placement. Moreover, embodiments of the hotspot instruction 703 may further include descriptions of objects, entities or other features extracted from the set of video frames 601 that may be used to define the hotspot location within the frame. For instance, in the example above where object being identified within the video frame is the beach, the hotspot instruction 703 may be written to include "object_desc": "beach".

User analytics 617 can be utilized and applied by the content generation system 509 to help influence decisions regarding the identification of hotspots within the incoming set of video frames 601, content selection and the type of interactivity to apply to the video frames when selected content is presented. User analytics 617 may be statically configured or learned over time based on each of the consumer's interactions with previous interactive content served by the content generation system 509. During static configuration of consumer preferences 619 or consumer insights 621, the user, application developer(s), and/or administrator(s) may manually input and configure settings and/or preferences for each user of an application or service into one or more user analytics databases or repositories. For example, by inputting the manually configured insights about the user and preferences of the user into the consumer insight 621 database and/or the consumer preferences 619 database. In some embodiments, a user or developer may not have all the information they need to directly input insights or preferences into one or more of the user analytics 617 databases. Instead, user analytics 617 may apply one or more machine learning algorithms to collect data about each user and learns insights and preferences of each user over time. In some embodiments, user analytics 617 may use one or more datasets collected and stored within available repositories describing past user behavior and preferences. For example, applications and services may record app-specific data 625 describing user interactions with the interactive content and user analytics 617 may analyze how users interact with the interactive content being presented as well as the overall habits of the user as the user interacts with the applications. Moreover, in some embodiments, the user analytics 617 may be able to collect and apply publicly available data 627 about the user to learn machine learning algorithms to further learn and understand consumer insights 621 and consumer preferences 619 about each user.

Embodiments of the content selection service 611 (referred to herein as "content selection 611") may receive the portion of code 631 describing the hotspot location(s) identified by the hotspot identification 609 and may expand upon the received code 631 by adding additional instructions defining the type of content that will be inserted and provided to the user as part of the altered video frames. Content selection 611 may include as interactive content any type of audio and/or visual experience that may be applied to the incoming set of video frames 601. The content may comprise text, video, images, web pages, audio waveforms, and combinations thereof. The content may be retrievable from one or more repositories 623 and may be specific to the application (i.e., app-specific data) or may retrieved from publicly available data sources (i.e., public data 627). For example, content selection 611 includes an application of features such as advertisements, embeddable movies or videos, insertable annotations or messages, web pages, educational or supplemental materials and/or hyperlinks thereto, polls, chat boxes, interactive forums, dashboards, etc. Content selection 611 may further consider the selection of content based on the user's known preferences and/or insights obtained about the user in order to customize the selection of content to meet the user's interests and/or may be calculated to pique the interest of the user to interact, increasing engagement with the content.

Figure 7B:
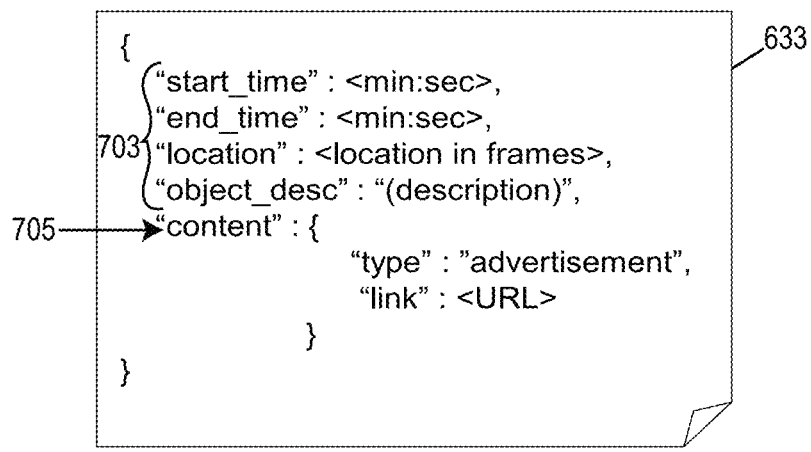
FIG. 7B further illustrates an embodiment of an additional portion of code added to the portion of code of FIG. 7A, wherein the additional code depicts an example of instructions selecting the content being introduced into the altered frames of the video by defining within the instructions the selected content that will be shown to a user at each corresponding hotspot that has been identified.

The drawing of FIG. 7B depicts an example of a portion of code 633 that includes content instructions 705 identifying the type of content that will be shown to the user as part of the altered frames. In other words, the content instructions 705 may define what is shown to the user. In the example of FIG. 7B, the portion of code 633 represented in the Figure that builds upon the hotspot instructions 703 of FIG. 7A. For the hotspot identified by the hotspot instructions 703, the content instruction 705 defines the selected content that is shown when the parameters defined by the hotspot are met. More specifically, at a particular point in time within the altered set of video frames while the interactive content is being played, the selected content will be shown and interactable with the user. In the particular example of FIG. 7B, when the described object is shown between the start time and end time prescribed by the hotspot instructions 703, content selection 611 has selected an advertisement in the form of a URL hyperlink that will be displayed to the user at the defined location of the hotspot instruction 703 as part of the altered video frames.

Embodiments of the content generation system 509 may further comprise interaction type selection and placement 613 service (referred to herein as "interaction service 613"). The interaction service 613 may be responsible for defining the type of interaction modes that may be suitable for the user receiving the interactive content and for the type of content selected by content selection 611 for insertion into the altered video frames of the interactive content being generated. More specifically, the interaction service 613 may define how selected content is presented and shown to the user, and such a selection of the mode of interaction being used may take into consideration the consumer insights 621 and consumer preference 619 during the customization process of the incoming set of video frames 601. For example, based on consumer insights 621 and consumer preferences 619, the content may be presented in a manner most optimal for engaging with the user and/or known to be presented to the user in a preferred manner. For instance, the interaction with the content may be skippable or mandatory, may interrupt or be placed over the video frames requested by the user, placed off to the side or moveable, a pop-up etc.

Figure 7C:
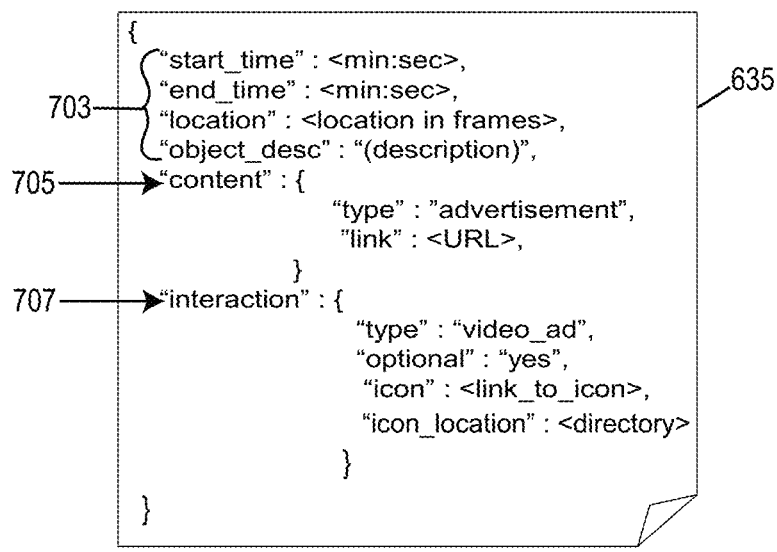
FIG. 7C further illustrates an embodiment of an additional portion of code added to the portion of code of FIG. 7B, wherein the additional code depicts an example of instructions selecting the interaction type and placement within the altered video frames, and said instructions define how the selected content is shown for each interaction type selected.

FIG. 7C depicts an example a portion of code 635 that includes interaction instructions 707 defining the type of interaction being used to present the selected content defined by content instructions 705 of the code 635. In the example of FIG. 7C, the interaction instructions define the presentation of the selected advertisement content to be presented as an optional video advertisement. The video advertisement is presented as an optional video that can be viewed by interacting with an icon linked to the URL as defined by the selected content instructions 705.

Embodiments of the content generation system 509 may employ an interactive video creation service 615 to apply the alterations to incoming set of video frames in the manner defined by the instructions created by hotspot identification 609, content selection 611 and the interaction services 613. The interactive video creation service 615 may ingest the incoming set of video frames and the alteration instructions, applying the instructions to the set of video frames, implanting the interactive content as prescribed by the instructions as the prescribed interaction type at the identified hotspot locations, and outputting a final set of video frames that have been altered from the incoming set of video frames 601. The final set of video frames outputted by the interactive video creation service 615 may be cached by the interactive content cache 606 and outputted to the end user device 305. During the caching of the final set of video frames that have been altered from the incoming set of video frame 601, the interactive content cache 606 may reference the video frames used to create the cached final set of video frames, the user or cohort the final set of video frames was delivered to, along with the cached content (i.e., the altered set of video frames). The interactive content being cached at the interactive content cache 606 may be cached in accordance with the retention policy of the edge network 503, 505, and may additionally be transmitted for caching at other edge sites 620 of the edge network 503, 505, whereby if a different edge node or other sites of the edge network 503, 505 receive requests that can be fulfilled using the cached altered frames, the node or site of the edge network 503, 505 has the cached content readily accessible for transmission to the requesting user.

Use Cases of the Content Generation System

The system architecture of the content generation system as depicted in FIG. 6 may be utilized in the creation of many different types of interactive content that can be presented to users in response to requesting non-interactive or linear video frames or video streams. Examples of different uses by applying the system architecture presented and described herein may include personalized in-video advertisements, virtual education, video surveillance, video game experiences including AR/VR content, remote healthcare, and parental control of OTT video delivery services.

Use Case #1: Personalized In-Video Interactive Advertisements

Video streaming services and OTT video platforms insert advertisements at specific points of videos and/or may place images or icons in various positions within the frames of a video. However, unlike the proposed system described herein, the advertisements of video streaming services and/or OTT video platforms are pre-selected and placed in a manner statistically determined at the backend by a cloud server before streaming or content delivery to the end user is initiated. In contrast, the system described herein perform insertable clickable advertisements that are dynamically customized and insertable at various positions in-video based on user preferences and insights. For example, if a video has a beach scene, one consumer could see a link pop-up on the beach as an ad for a resort whereas another consumer could get an ad for clothing worn by a person on a beach while yet third consumer could get an ad for a can of soda held by the person, and all the different advertisements could be delivered for the same set of frames of the same video. The advertisement shown to the consumer may be dynamically determined based on the video content being consumed, the consumer's interaction previous interactive video as well as the consumer's surrounding context and preferences. Moreover, whether the advertisement is optional or clickable content as opposed to a forced advertisement can also be dynamically determined. For example, an advertisement can appear every 15 minutes of viewing a video or stream, and a user may be forced to watch one advertisement but may be able to skip others which may appear as pop-up windows with the ability of the user to interact with the advertisement in different ways. Furthermore, the specific placement and timing of advertisements can be dynamically determined and inserted into the videos, but the placement and/or timing may be different for different users, even when the same videos are viewed by different users or repeatedly viewed by the same user.

Use Case #2: Virtual Education

Interactive video is increasingly being used to distribute virtual education materials to students. Although the content being provided by the content providers may be interactive to a certain extent, the interactive content is statically created, whereby changes to the videos change based on choices of the user. For example, skipping a chapter or segment of the video, selection optional highlighting features, and activation of additional explanations for the materials being presented at various pre-determined timestamps. Embodiments of the system architecture presented herein differ from the statically created presentation of educational materials. Embodiments of interactive content created by the content generation system 509 is dynamically determined based on the knowledge proficiency and/or preferences of the student. For instance, a first student may prefer that the types of interactions selected by interaction service 613 are not forced choices and/or are hidden until the first student hovers over an icon or annotation, whereas a second student may want all interactions to pause the video, giving the student time to explore and review the interactive content when it becomes available at a particular hotspot, while a third student may prefer a transcript of the video or live streaming video data being presented to be shown at all time.

Additional examples of features that can be dynamic inserted as interactive content delivered to users as part of a virtual education experience may include the presentation of additional references to concepts that may be covered and discussed in the video which can be dynamically added as links to webpages or other interactions without the content producer 515 having to explicitly place them in the video. Furthermore, interactive features such as chat capabilities may be inserted allowing messaging between students or with experts who are simultaneously viewing educational content being presented as part of the virtual education session without the content provider having to explicitly add it. Moreover, references to a discussion forum and the ability to add students to the forums and/or setup web conferences dynamically.

Use Case #3: Video Surveillance

The use of video surveillance has become ubiquitous within society today and most commonly within urban settings. The landscape is often littered with a plethora of traffic cameras and closed-circuit television (CCTV) cameras, both inside buildings and positioned around the exterior thereof. Content generation system 509 can assist these existing surveillance systems by altering the linear video frames into interactive content, enhancing the benefits of the surveillance systems. For example, the linear video of traffic cameras can be altered to identify a license plate and annotate the linear video frames with the vehicle owner's details from the motor vehicle database, along with providing a hyperlink in the video stream to the ticket issuing systems used by enforcement agencies, all within the video being observed.

Additional feature sets can also be added to linear video frames of CCTV footage by the content generation system 509. For example, interactive content may include making individuals appearing within the CCTV video stream selectable, and upon being selected within the live streaming footage, the system can focus attention on the selected person's movements across the various CCTV cameras recording within the interior or exterior of a building. The system can automatically bring attention to the user of the CCTV system each time the selected individual is detected within the footage, in live time over a time-synced replay across multiple CCTV video sources.

In some situations, generating interactive content by the content generating system 509 can combine advertising and surveillance features. For example, a digital advertisement comprising video features placed in a public space may be monitored by and altered based on the persons within the vicinity of the advertisement. For example, as the monitoring system detects people approach the advertisement, the content generation system 509 may move the ad to the approaching customer's nearby mobile device. For example, by dynamically inserting a scannable QR code into the video frames playing the advertisement or using Bluetooth-based technology to transfer the ad or play supplemental content on the approaching customer's device.

Use Case #4: Gaming, Augmented Reality/Virtual Reality

Withing the gaming industry, interactive games exist that are pre-programmed with stories and gameplay that unfold based on the choices made by the user. The fixed set of choices may alter the gameplay; however, each choice leads to a pre-destined outcome as determined by the game's developers. Using the ability to create interactive video content, embodiments of the content generation system 509 can build upon games in the AR and VR space by blending the virtual world and physical world. For example, games can be created that can extend to videos shared by members in a game or gaming lobby with game content dynamically inserted into the "augmented" video streams.

In other embodiments, the interactive content generated by the content generation system 509 can be extended to video streams of live sporting events. Beyond dynamically inserting advertising, sponsorship information and/or supplemental content about the competitors during the live video stream, dynamically inserted content can leverage different camera angles that may be available during the streaming of the video or change how the content is viewed. For example, if a consumer is viewing live streaming video of a race, the content generation system 509 may create a feature that allows users to view the race from inside a cockpit of a racecar driving alongside the competitors as the user is watching the race. The user may be able to toggle the experience dynamically based on the available viewing angles of the race made available by the content producer 515, allowing the user to move their simulated vehicle "positioned" within the race to be alongside other competitors and at the viewing users switches the streaming video from one competitor to the next during the user's viewing experience.

Use Case #5: Remote Healthcare

Remote teams of specialists managing patient care from a distance is becoming more of a common practice. During remote surgeries, specialists from around the world can view live streaming video and data, providing consultation with doctors and nurses while care is being provided. Embodiments of the content generation system 509 can dynamically provide interactive content customized for each of the participating doctors viewing the live streaming video, whereby interactions introduced at the edge network 503, 505 can infuse the live streaming video with knowledge and data about patients that is relevant to each participating remote doctor's specialization. For example, video frames altered with interactive content can include AI-based assistants and references that are specific to the viewing doctors' area of expertise. Interactive content can raise attention to a particular live video stream (among several viewing angles during the surgery) for a subset of specialists; permit interactive inquiries by specialists within a chat interface while specialists are monitoring data. As the surgeries and other types of care are being provided and streamed on video, interactive content can be inserted to provide AR/VR perspectives that simulate an activity and/or predicts outcomes that may happen in response to a surgeon's actions. The interactive content may also be inserted into the video frames that allow additional surgeons to simulate performing the procedure using inserted AR/VR content and/or demonstrate during AR/VR how actions should be performed during a surgery. In some embodiments, a dynamic dashboard may be inserted into the video frames providing data describing the surgery progress, highlights, patient health information such as vital statistics, potential risks, etc.

Use Case #6: Parental Controls and Dynamic Editing of OTT Video Services and Video Streams Streaming of video content can require editing of video content in certain situations when explicit content is not appropriate or desired to be displayed. For example, due to user preferences or regional jurisdiction. Currently, parental controls and/or content controls may prevent certain users from viewing specific types of content altogether, and/or may require video modification outside of the network to edit or remove the undesired content. Content producers 515 may have to reupload a modified version of the video content that no longer includes the undesirable frames or content in order to make the content comply with jurisdictions or make the content appropriate for particular audiences. The content generation system 509 described herein can edit videos on the fly and enable removal of undesirable content within the video stream by knowing the audience's information (i.e., such as age and location) by detecting the presence of explicit content that may not be appropriate for one or more audience members and dynamically altering frames to remove or obscure portions of content. For example, the content generation system 509 can detect the presence of undesirable or inappropriate content based on user preferences, parental preferences, consumer insights and/or location information. The content generation system 509 can add overlay messages, skip frames and/or allow a user, through a click-based interface whether the user would like to view or skip portions of the video content entirely. In some embodiments, the content generation system 509 may present a user-appropriate summary to briefly recap to the user any missed portions of story elements or important information that may be otherwise missed by choosing not to view the undesired content.

Exemplary Implementation of Use Cases

Figure 8A:
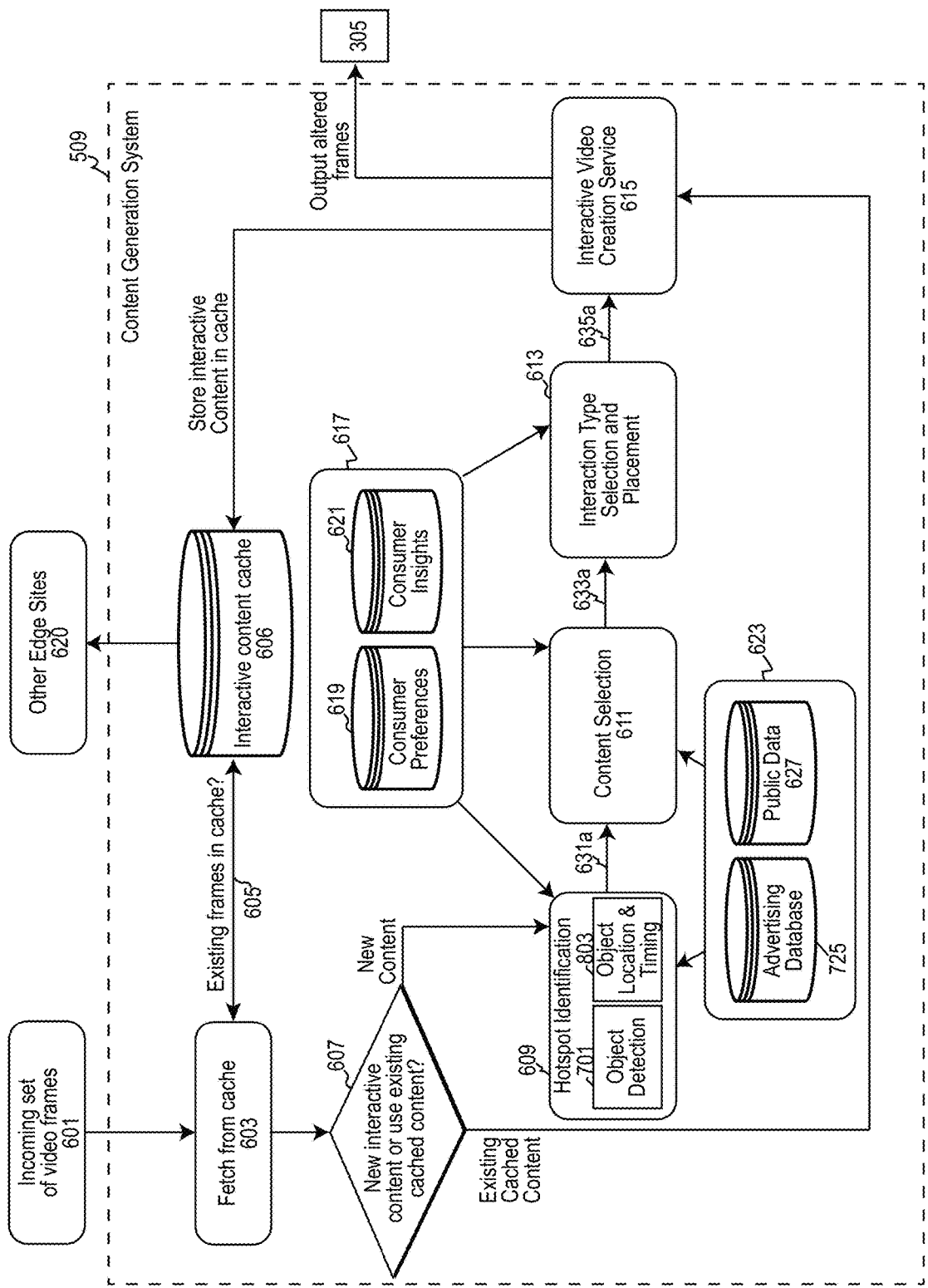
FIG. 8A depicts a block diagram describing an alternative embodiment of a content generation system of an edge node of a network, including an alternate embodiment of a workflow for a content generation system generating and caching interactive content comprising the insertion of one or more advertisements into a set of altered video frames.

Referring to the drawings, FIG. 8A-8D describe an exemplary embodiment of the content generation system 509 dynamically generating personalized in-video interactive advertisements that can be customized to the preferences and habits of individual users and consumers. As shown in FIG. 8A, when new content is generated, hotspot identification 609 can pre-process the incoming set of video frames 601 to identify optimal timings and locations for inserting interactive advertisements into the incoming set of video frames 601. In some embodiments, the timing and placement of the hotspot for introducing the advertisement can be based on the presence of a particular object that may be known to appeal to the user based on the consumer preferences 619 and/or consumer insights 621. An object detection 701 module may scan the incoming video frames 601 for objects that align with one or more preferences or habits of the user.

Figure 8B:
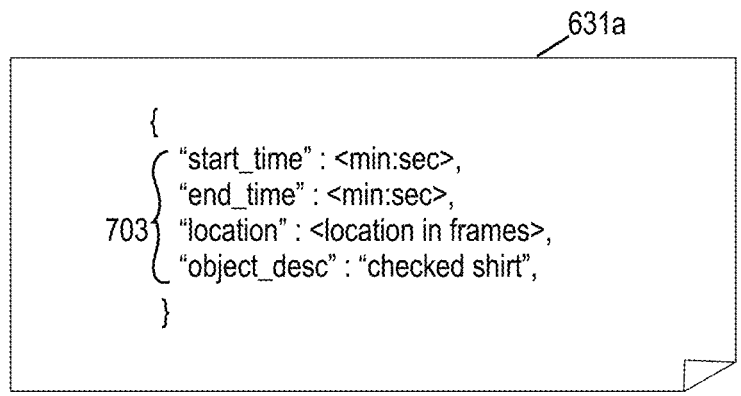
FIG. 8B illustrates an embodiment of a portion of code depicting an example of instructions for identifying a hotspot for altering frames of a video using the content generation system of FIG. 8A, said instructions defining when and where advertisements of interactive content will occur within the altered video frames.

Once identified by object detection 701, the object location and timing 803 module may record the period of time or timestamp where the object is introduced within the video frames and the position of the object within the video frames. The timing and position may be recorded and inputted into code comprising a set of instructions for altering the frames of the incoming set of video frames. An example of the portion of code 631*a* comprising hotspot instructions 703 is depicted in FIG. 8B, wherein the type of object, the location of the object and the time period the object is present within the frames are inputted into the instructions 703 as shown. In the example of FIG. 8B, the object detected corresponding to the user's preferences is described by the instructions 703 is a checked shirt.

Figure 8C:
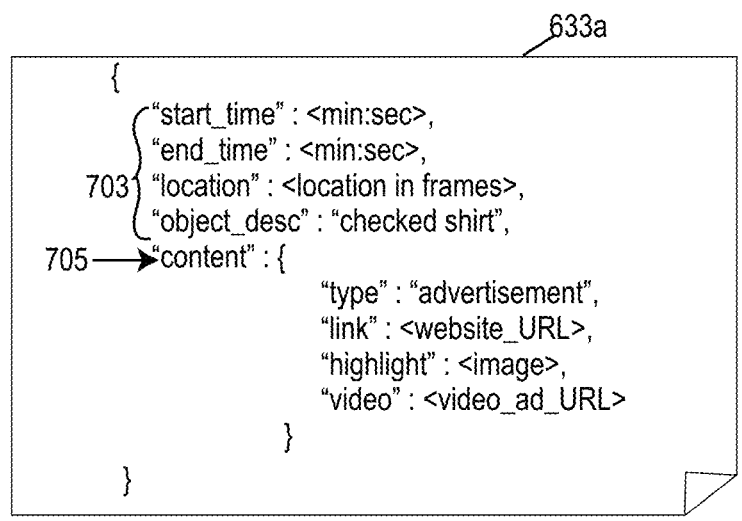
FIG. 8C illustrates an embodiment of an additional portion of code added to the portion of code of FIG. 8B, wherein the additional portion of code depicts an example of instructions selecting the type of advertising content introduced into the altered frames of the video at each corresponding hotspot defined in the code of FIG. 8B.
Figure 8D:
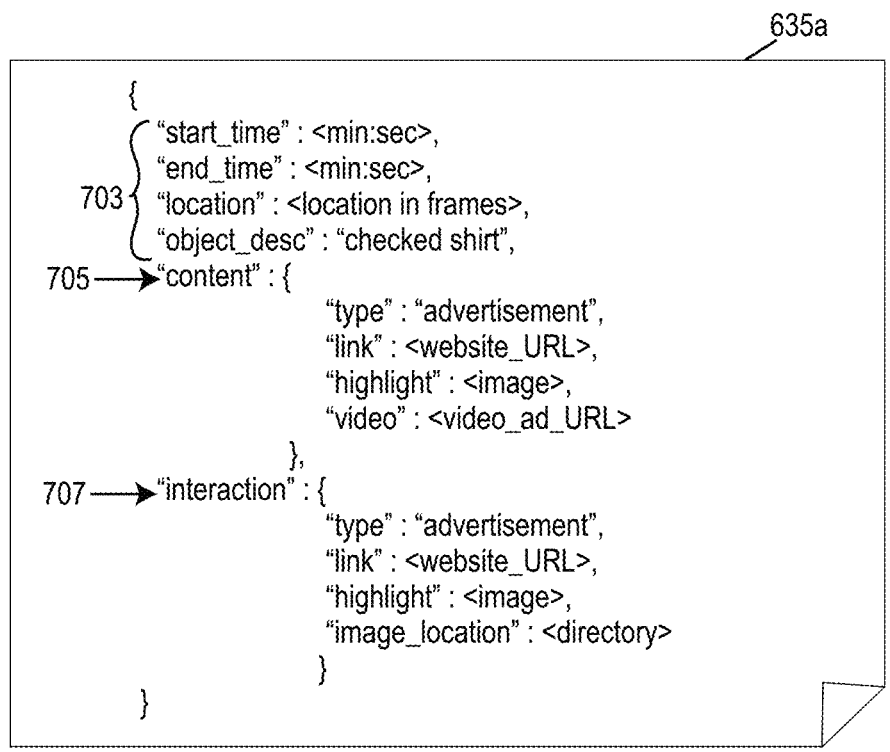
FIG. 8D illustrates an embodiment of an additional portion of code added to the portion of code of FIG. 8C, wherein the additional portion of code depicts an example of instructions selecting the interaction type and placement within the altered video frames, and said instructions define how the selected type of advertising content is shown for each interaction type selected.

Following hotspot identification 609, the portion of code 631*a* can be passed to content selection 611 for the selection of the interactive content that will be shown to the user at the identified hotspot prescribed by the hotspot instructions 703. In this example, content selection 611 may select one or more or more advertisements from an advertising database 725 and/or public data 627 for insertion into the altered set of video frames. Content selection 611 can define the selected content elected to be shown to the user by defining the content within the content instructions 705 of the portion of code 633*a* as seen in FIG. 8C. As visually depicted within FIG. 8C, the content instructions 705 in this example sets the content to a particular advertisement selected by the content selection 611 with a specific URL link to the advertisement and the video of the advertisement highlighted within the video frames at the identified hotspot location. The code 633*a* can be passed to the interaction service 613 wherein the selection of the type of interaction that would be optimal and/or preferred by the user given the users consumer preferences 619 and consumer insights 621 of the requesting user as interaction instructions 707. In the case of the FIG. 8D, the selected interaction is a highlighted image placed within the video frames at the designated hotspot, whereby the highlighted image in the video frames leads to the URL link of the selected advertisement. Upon altering the incoming set of video frames 601 in accordance with the piece of code 635*a* via the interactive video creation service 615, the content generation system 509 can cache the interactive content containing the advertisement to the interactive content cache 606, which may be shared with other edge site(s) 620 of the edge network 530, 505.

Figure 9A:
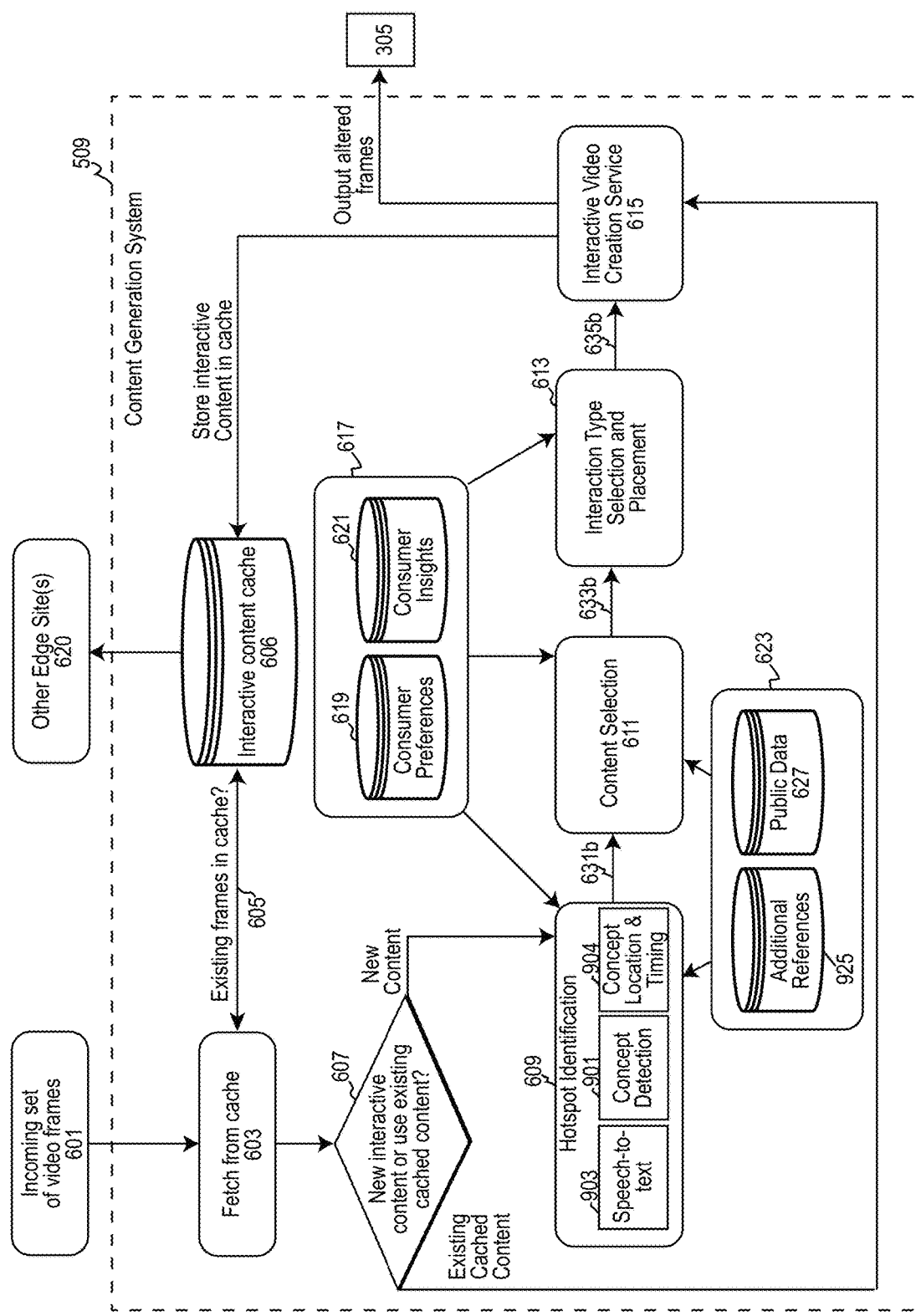
FIG. 9A depicts a block diagram describing a second alternative embodiment of a content generation system of an edge node of a network, including a second alternate embodiment of a workflow for a content generation system generating and caching interactive content comprising the insertion of one or more educational and/or supplemental material into a set of altered video frames.

Referring to the drawings, FIGS. 9A-9D describe an exemplary embodiment of the content generation system 509 dynamically generating personalized virtual education content delivery to students, which can be customized to the preferences and habits of consumers. As shown in FIG. 9A, when new content is generated, hotspot identification 609 can pre-process the incoming set of video frames 601 to identify optimal timings and locations for inserting interactive features that can complement the educational materials being presented by the incoming set of video frames 601. In some embodiments, the timing and placement of the hotspot for introducing the supplemental educational materials can be based on detecting a particular concept being introduced by the educational materials of the incoming set of video frames that the user may be known to be interested in based on the consumer preferences 619 and/or consumer insights 621 may be known that the user struggles with understanding the particular concept being discussed and thus may benefit from the supplemental interactive materials. Incoming sets of video frames 601 may be converted from speech-to-text by a speech-to-text module 903. Upon converting speech to text, a concept detection module 901 may scan the transcript outputted from the speech-to-text module 903 for one or more concepts of interest and flag the concept as potential hotpots to insert additional supplemental educational materials and/or other interactive features.

Once potential hotspots have been identified by concept detection 901, the concept location and timing module 904 may record the period of time and/or timestamps where the concept is introduced or discussed during the video frames. Concept detection and location module 904 may record the timing and location of the concept during the video frames, input the identified hotspot locations into code comprising a set of instructions for altering the frames of the incoming set of video frames 601. An example of the portion of code 631*b* comprising hotspot instructions 703 is depicted in FIG. 9B, wherein the concept's description, the location of the concept in the frames and the time period the concept is presented within the video frames are inputted into the instructions 703 as shown. In the example of FIG. 9B, the concept detected corresponding to the introduction of interactive content is described by the instructions 703 as "Newton's laws of motion".

Following hotspot identification 609, the portion of code 631*b* can be passed to content selection 611 for the selection of the interactive content that will be shown to the user at the identified hotspot prescribed by the hotspot instructions 703. In this example, content selection 611 may select one or more or more supplemental educational materials or interactive elements to compliment the discussion of Newton's laws of motion from repository 623, such as the public data 627 and/or an additional references 925 repository, for insertion into the altered set of video frames. Content selection 611 can define the selected content elected to be shown to the user by defining the content within the content instructions 705 of the portion of code 633*b* as seen in FIG. 9C. As visually depicted within FIG. 9C, the content instructions 705 in this example sets the content to a particular website and URL to the website, along with a video and video URL selected by the content selection 611. The code 633*b* can be passed to the interaction service 613 wherein the selection of the type of interaction that would be optimal and/or preferred by the user given the users consumer preferences 619 and consumer insights 621 of the requesting user as interaction instructions 707. In the case of the FIG. 9D, the selected interaction is a highlighted image placed within the video frames at the designated hotspot, whereby the highlighted image links the image with the URL to the selected website. Moreover, the video selected as content to be provided can be optionally played at the user's discretion. Upon altering the incoming set of video frames 601 in accordance with the piece of code 635*b* via the interactive video creation service 615, the content generation system 509 can cache the interactive content containing the altered frames with the links to the website URL and optional video to the interactive content cache 606, which may be shared with other edge site(s) 620 of the edge network 530, 505.

Figure 10A:
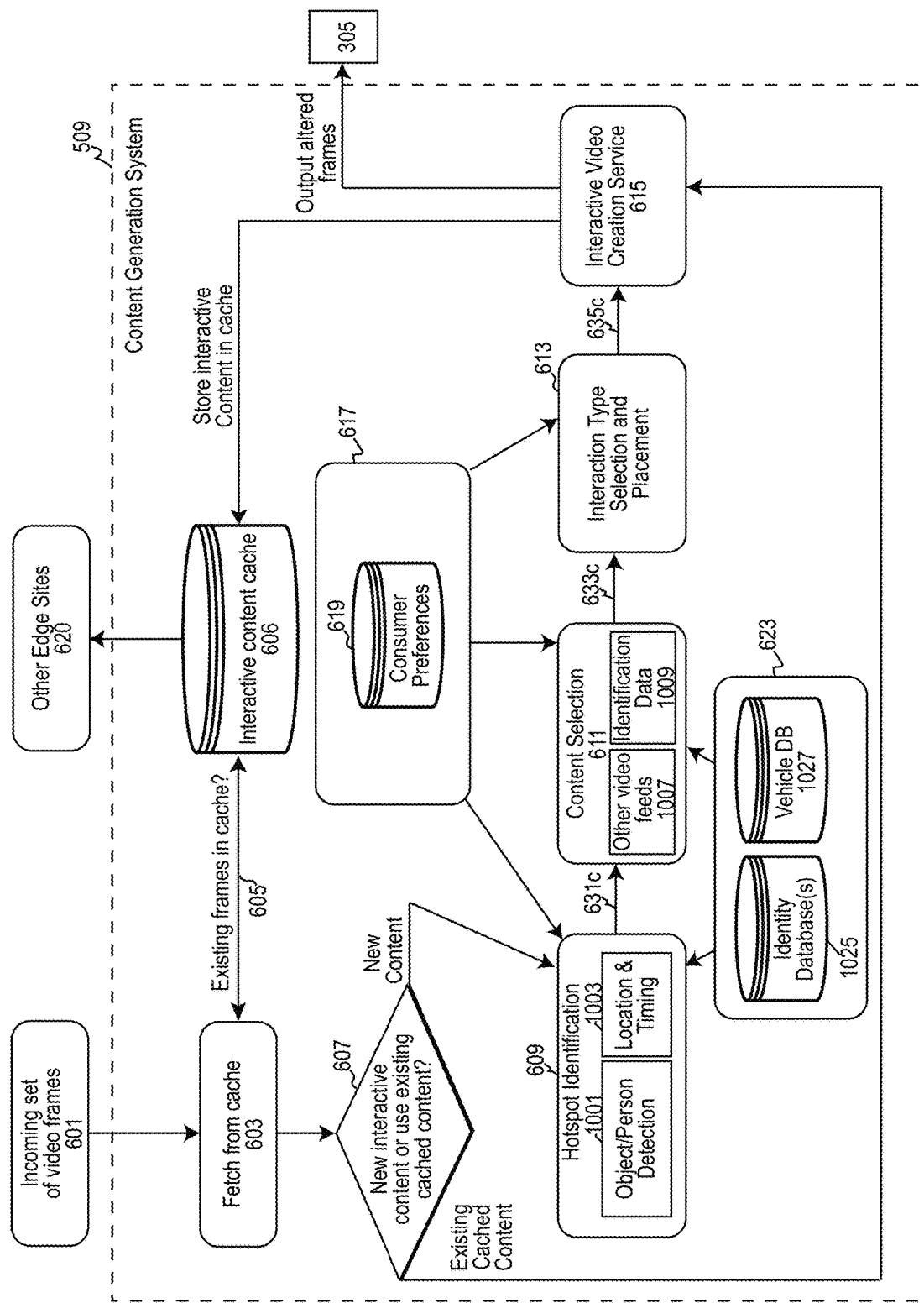
FIG. 10A depicts a block diagram describing a second alternative embodiment of a content generation system of an edge node of a network, including a second alternate embodiment of a workflow for a content generation system generating and caching interactive content comprising the insertion of tracking content as part of a set of altered video frames.

Referring to the drawings, FIGS. 10A-10D describe an exemplary embodiment of the content generation system 509 dynamically generating interactive content that can be dynamically inserted into streaming surveillance video and may be customized to the preferences of the user analyzing the video frames. As shown in FIG. 10A, when new content is generated, hotspot identification 609 can pre-process the incoming set of video frames 601 to identify optimal timings and locations for inserting interactive features that can complement the live streaming and/or time-delayed surveillance footage being presented by the incoming set of video frames 601. In some embodiments, the timing and placement of the hotspot for introducing the interactive and/or supplemental materials can be based on detecting a particular object or person being displayed as part of video footage from one or more of the incoming sets of video frames from various surveillance sources. For example, a person of interest having a particular description and/or vehicle with an identifiable license plate. Incoming sets of video frames 601 may scanned by an object/person detection module 1001 and matched against an identity database 1025 or a vehicle database 1027. Upon detecting one or more persons or objects of interests, hotspot identification 609 can flag the appearance of the person, object, vehicle, etc. as potential hotpots to insert interactive features, such as making the detected objects or persons selectable, and/or displaying supplementary information about each person or object of interest to the user.

Once potential hotspots have been identified by object/person detection module 1001, the location and timing module 1003 may record the period of time and/or timestamps where the objects or persons of interest within the video frames are introduced or are made visible. Location and timing module 1003 may record the timing and location of the object or person during the video frames, input the identified hotspot locations into code comprising a set of instructions for altering the frames of the incoming set of video frames 601 with interactive content. An example of the portion of code 631c comprising hotspot instructions 703 is depicted in FIG. 10B, wherein the object of interest is a vehicle. The location of the vehicle in the frames and the time period the vehicle is identified as being present within the video frames are inputted into the instructions 703 as shown. In some embodiments, the object description for the vehicle may include additional information. For example, a make and model of the vehicle and/or a license plate number to further distinguish the vehicle being tracked to other vehicles that may be visible within the incoming set of video frames 601.

Following hotspot identification 609, the portion of code 631c can be passed to content selection 611 for the selection of the interactive content that will be shown to the user at the identified hotspot prescribed by the hotspot instructions 703. In this example, content selection 611 may select a vehicle being displayed by the video frames and add interactive elements to video such as annotations and additional video footage to compliment the surveillance footage. The video inserted into the video frames being altered may include other video feeds 1007 provided by additional surveillance camera sources, while the annotations may be provided from identification data 1009 coming from an identity database 1025 and/or a vehicle database 1027 (i.e., public motor vehicle information or law enforcement database). Content selection 611 can define the selected content elected to be shown to the user by defining the content within the content instructions 705 of the portion of code 633c as seen in FIG. 10C. As visually depicted within FIG. 10C, the content instructions 705 in this example sets the content to another video linked from a separate video surveillance source and annotations overlayed onto the video frames which provide additional supplemental information as the user is viewing the surveillance footage. The code 633c can be passed to the interaction service 613 wherein the selection of the type of interaction that would be optimal and/or preferred by the user given the users consumer preferences 619 of the requesting user as interaction instructions 707. In the case of the FIG. 10D, the selected interaction is an opportunity for the viewer to optionally open the separate video footage associated with the other video feeds 1007 and annotations. Upon altering the incoming set of video frames 601 by the interaction video creation service in accordance with the piece of code 635c, the content generation system 509 can cache the interactive content containing the altered frames containing the annotations and optional video frames from other surveillance source at the hotspot locations with the interactive content cache 606, which may be shared with other edge site(s) 620 of the edge network 530, 505.

Method for Dynamically Generating Interactive Video Content at the Edge Cloud

Figure 11:
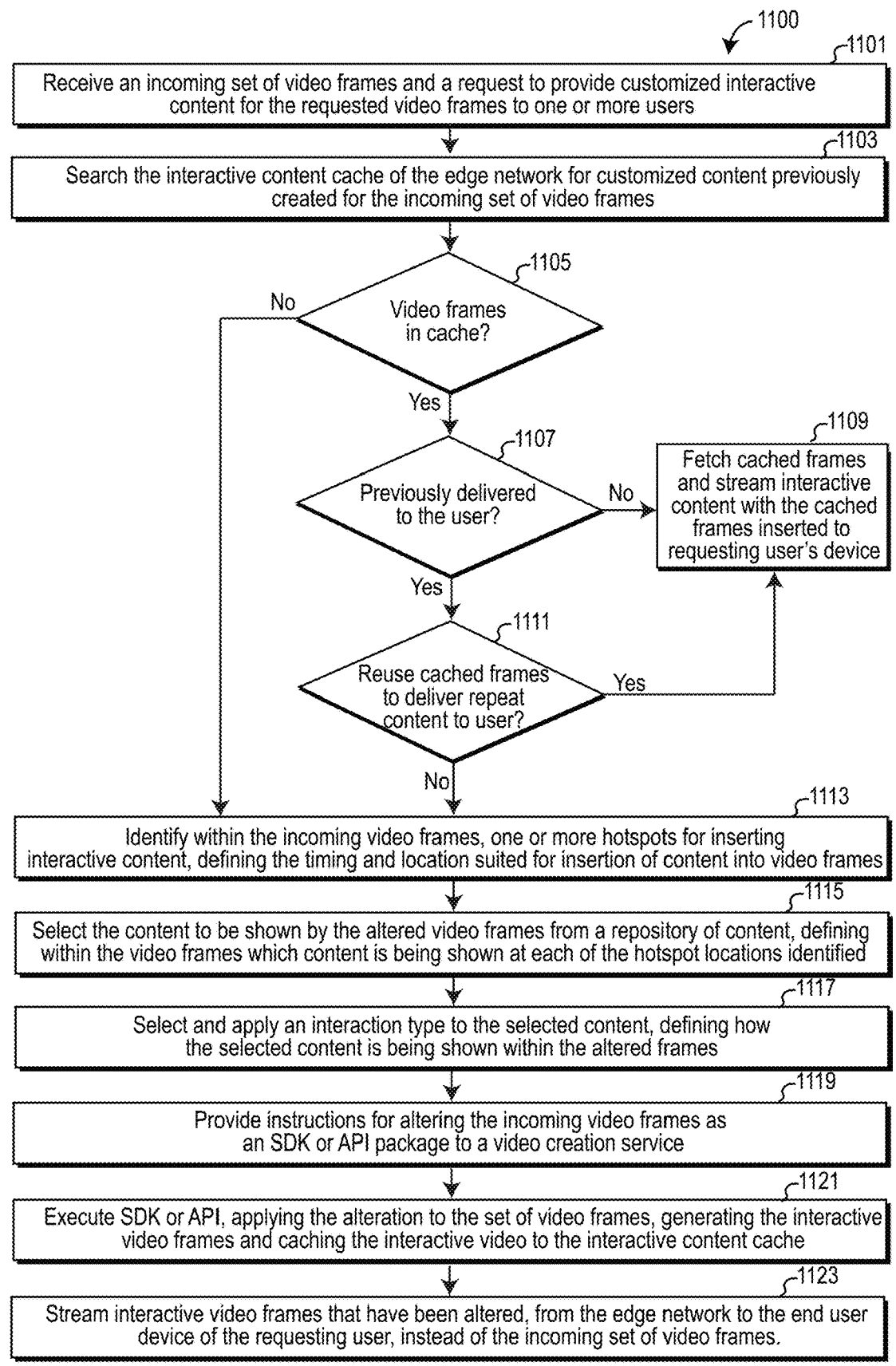
FIG. 11 depicts a flow diagram describing an embodiment of a method for dynamically generating, caching and/or serving interactive video content by an edge node of a network to an end user, in accordance with the present disclosure.

The drawings of FIG. 11 represent embodiments of methods for dynamically generating interactive video content at the edge cloud, in accordance with FIGS. 3-10D described above, using one or more computing systems defined generically by computing system 100 of FIGS. 1-2; and more specifically by the embodiments of the specialized systems and/or computing environments depicted in FIGS. 3-10D and as described herein. A person skilled in the art should recognize that the steps of the method described in FIG. 11 may be performed in a different order than presented and may not require all the steps described herein to be performed.

The embodiment of method 1100 described by FIG. 11 may begin at step 1101. During step 1101 the content generation system 509 positioned an edge site 620 of an edge network 503, 505 may receive an incoming set of video frames 601 with a request from the cloud service provider to alter the video frames 601 to include customized interactive content. In step 1103, the content generation system 509 may search an interactive content cache 606 of the edge network 503, 505 for interactive content (i.e., an altered set of video frames) previously created for the incoming set of video frames 601. In step 1105 a determination is made, based on the search of the interactive content cache 606, whether or not the content is cached with the edge network 503, 505. If the cached content associated with the incoming set of video frames 601 does not exist within the interactive content cache 606, the method 1100 may proceed to step 1113 wherein new content for the incoming set of video frames 601 can be generated. Conversely, if there is cached content associated with the incoming set of video frames 601 that have been previously generated and may be re-used again, the method 1100 may proceed to step 1107.

During step 1107, the content generation system 509 may further determine whether the cached content stored by the interactive content cache 606 has been previously delivered to the user intended to receive the interactive content created using incoming set of video frames 601 and/or delivered recently within a threshold period of time to the user. By cross checking whether the user has received or at the very least recently received the cached content, the content generation system can ensure that the same interactive content has not been repeatedly received by the same users or being received too frequently. If the cached content stored by the interactive content cache 606 that is associated with the incoming set of video frames 601 has not been previously delivered to the user, the method 1100 may proceed to step 1109, whereby during step 1109, the content generation system 509 fetches the cached altered frames and/or streams the interactive content with the cached frames inserted therein to the end user device 305. If on the other hand, the content has been previously delivered to the user, the method 1100 may proceed from step 1107 to step 1111.

During step 1111 further determination may be made whether or not to reuse the cached frames and therefore deliver repeated content to the user that has been previously viewed. For example, as part of the determination whether or not to reuse the cached content, the content generations system 509 may compare the last time the user received the cached content and determine whether or not the last receipt of the cached content by the user exceeds a threshold period of time. If the content generation system 509 determines that reusing the cached frames stored by the interactive content cache 606 is appropriate (i.e., a requisite amount of time beyond the threshold period of time has elapsed), then the method 1100 proceeds from step 1100 to step 1109, wherein the content generation system fetches the cached frames from the interactive content cache 606 and delivers the altered video frames from the cache to the user. Likewise. If a determination is made by the content generation system 509 not to reuse the cached frames stored by the interactive content cache 606, the method 1100 may proceed to step 1113 wherein the content generation system may begin generating new interactive content by altering the incoming set of video frames 601 which may be subsequently cached for usage later on for subsequent requests by other users.

During step 1113 of method 1100, the content generation system 509 may identify within the incoming set of video frames 601 one or more suitable hotspots for inserting interactive content, wherein the identified hotspots identify the timing and location for the insertion of the content into the video frames, by altering the video frames to include the selected content. Identification of the hotspots may be performed by a hotspot identification 609 service that may be running as part of the content generation system 509 and/or a service running as part of the edge network 503, 505. In some embodiments, hotspot identification 609 may process the incoming set of video frames by performing speech-to-text 903 conversion of the existing content, object detection 701, concept detection 901 and/or object/person detection 1001. Hotspots may be defined by hotspot identification 609 based on the presence of one or more detected objects, concepts, persons etc., that may align with consumer preferences 619 and/or consumer insights 621 of the user targeted to receive the interactive content. Hotspot identification 609 may define the timing and location of the hotspots as code comprising one or more instructions for altering the incoming set of video frames 601.

In step 1115 the selection of content to be shown to users within the altered video frames for each of the designated hotspot locations identified by hotspot identification 609. A content selection 611 service running as part of content generation system 509 and/or edge network 503, 505 may select content to be displayed for interaction with a user from a repository 623. Content selection 611 may build upon the code comprising hotspot identification instructions by writing additional instructions within the code defining which content will be displayed at each identified hotspot location within the altered video frames. In step 1117, an interaction service 613 may select and apply one or more types of interactions that will occur to display or present the content selected by content selection 611. The types of interactions may be selected based on the preferences and/or insights known to the content generation system 509 about the user intended to receive the interactive content comprising the altered set of video frames. Interaction service 613 may further build upon the code comprising instructions written by hotspot identification 609 and/or content selection 611, further defining within the instructions the type of interaction to use within the altered frames to present or display the selected content to the user.

In step 1119, the code comprising the instructions prepared by hotspot identification 609, content selection 611 and/or interaction service 613 may be packaged into an SDK, API, an executable script or any other type of format that may be read and implemented by an interactive video creation service 615. The packaged instructions may be sent to the interactive video creation service 615, whereby in step 1121, the packaged instructions such as the SDK or API can be executed by the interactive video creation service 615 to apply alterations described by the instructions to the incoming set of video frames 601. The interactive video creations service 615 upon applying the code comprising the instructions for generating the interactive content may output the generated interactive content comprising the altered video frames that include the interactive content. Interactive video creation service 615 may cache the altered video frames with the interactive content cache 606 for reuse by other users. In step 1123, the altered video frames comprising the interactive content at each of the defined hotspot locations can be streamed from the edge network 503, 505 to the end user device 305, instead of the incoming set of video frames 601.

What is claimed is:

1. A computer-implemented method for dynamically generating interactive video content at an edge node of an edge network, the computer-implemented method comprising:
   receiving, by a processor of the edge node, a set of incoming video frames;
   identifying, by the processor, one or more hotspots within the incoming video frames to insert an interactive content, wherein each of the one or more hotspots are defined within a set of instructions including a timing within the incoming video frames and location within the incoming frames for inserting the interactive content and wherein the interactive content does not contain promotional content material;
   selecting, by the processor, content from a repository configured to be inserted within the incoming video frames at each of the one or more hotspots defined by the set of instructions, wherein the content from selected from the repository is defined within the set of instructions;
   selecting, by the processor, an interaction type defining within the set of instructions how the content is shown at each of the one or more hotspots;
   executing, by the processor the set of instructions, altering the incoming video frames to an altered set of video frames containing the content selected that is configured to be presented to a user at each of the one or more hotspots using the interaction type defined within the set of instructions;
   caching, by the processor, the altered video frames to an interactive content cache of the edge network;
   outputting, by the processor, the altered video frames to an end user device placed in communication with the edge network;
   learning, by the processor, consumer insights and preferences of each user as a result of the user interactions with the interactive content outputted by the edge network to each corresponding user; and
   in response to receiving incoming video frames by each corresponding user, applying, by the processor, the consumer insights and preferences of the corresponding user to influence hotspot identification, content selection and the interaction type or placement of the interactive content within the altered frames.

2. The computer-implemented method of claim 1, further comprising:
   in response to receiving a request to provide the incoming frames to a second end user device, searching, by the processor, the interactive content cache of the edge network for previously generated interactive content comprising the altered video frames;
   fetching, by the processor, the altered frames from the interactive content cache of the edge network; and
   outputting, by the processor, the set of altered frames from the edge network to the second user device.

3. The computer-implemented method of claim 2, wherein, the request to provide the incoming frames to the second end user device is received by a second edge node of the edge network, and the altered frames stored by the interactive content cache is shared by the edge node with the second edge node of the edge network.

4. The computer-implemented method of claim 1, wherein identifying the one or more hotspots further comprises:
   detecting, by the processor, a set of one or more objects displayed within the incoming video frames; and setting, by the processor, the timing and the location of the one or more hotspots as defined by the set of instructions to a time and location within the incoming frames where a detected object is displayed as part of the set of one or more objects within the incoming video frames.

5. The computer-implemented method of claim 1, wherein identifying one or more hotspots further comprises:
converting, by the processor, speech-to-text of the incoming video frames;
detecting, by the processor, based on a conversion of speech-to-text of the incoming video frames, one or more concepts discussed within the incoming video frames; and
setting, by the processor, the timing and the location of the one or more hotspots as defined by the set of instructions to a time and location within the incoming frames where the one or more concepts is detected based on the conversion of the speech-to-text of the incoming video frames.

6. The computer-implemented method of claim 1, wherein the content being inserted into the incoming frames at each of the one or more hotspots is selected from the group consisting of supplemental educational videos, web pages, chat services, video conferencing, one or more video feeds, and combinations thereof.

7. The computer-implemented method of claim 1, wherein the consumer insights and preferences can include, educational topic of interest to the user, particular object of interest to the user, other separate video footage associated with a video surveillance system that is of interest to the user and content of a video that is suitable to an age of the user.

8. A computer system for dynamically generating interactive video content at an edge node of an edge network comprising:
a processor;
an interactive content cache coupled to the processor; and
a computer-readable storage media coupled to the processor, wherein the computer-readable storage media contains program instructions executing, via the processor, a computer-implemented method comprising:
receiving, by the processor of the edge node, a set of incoming set of video frames;
identifying, by the processor, one or more hotspots within the incoming video frames to insert an interactive content, wherein each of the one or more hotspots are defined within a set of instructions including a timing within the incoming video frames and location within the incoming frames for inserting the interactive content and wherein the interactive content does not contain promotional content material;
selecting, by the processor, content from a repository configured to be inserted within the incoming video frames at each of the one or more hotspots defined by the set of instructions, wherein the content from selected from the repository is defined within the set of instructions;
selecting, by the processor, an interaction type defining within the set of instructions how the content is shown at each of the one or more hotspots;
executing, by the processor the set of instructions, altering the incoming video frames to an altered set of video frames containing the content selected that is configured to be presented to a user at each of the one or more hotspots using the interaction type defined within the set of instructions;
caching, by the processor, the altered video frames to the interactive content cache of the edge network;
outputting, by the processor the altered video frames to an end user device placed in communication with the edge network;
learning, by the processor, consumer insights and preferences of each user as a result of the user interactions with the interactive content outputted by the edge network to each corresponding user; and
in response to receiving incoming video frames by each corresponding user, applying, by the processor, the consumer insights and preferences of the corresponding user to influence hotspot identification, content selection and the interaction type or placement of the interactive content within the altered frames.

9. The computer system of claim 8, further comprising:
in response to receiving a request to provide the incoming frames to a second end user device, searching, by the processor, the interactive content cache of the edge network for previously generated interactive content comprising the altered video frames;
fetching, by the processor, the altered frames from the interactive content cache of the edge network; and
outputting, by the processor, the set of altered frames from the edge network to the second user device.

10. The computer system of claim 9, wherein, the request to provide the incoming frames to the second end user device is received by a second edge node of the edge network, and the altered frames stored by the interactive content cache is shared by the edge node with the second edge node of the edge network.

11. The computer system of claim 8, wherein identifying the one or more hotspots further comprises:
detecting, by the processor, a set of one or more objects displayed within the incoming video frames; and
setting, by the processor, the timing and the location of the one or more hotspots as defined by the set of instructions to a time and location within the incoming frames where a detected object is displayed as part of the set of one or more objects within the incoming video frames.

12. The computer system of claim 8, wherein identifying one or more hotspots further comprises:
converting, by the processor, speech-to-text of the incoming video frames;
detecting, by the processor, based on a conversion of speech-to-text of the incoming video frames, one or more concepts discussed within the incoming video frames; and
setting, by the processor, the timing and the location of the one or more hotspots as defined by the set of instructions to a time and location within the incoming frames where the one or more concepts is detected based on the conversion of speech-to-text of the incoming video frames.

13. The computer system of claim 8, wherein the content being inserted into the incoming frames at each of the one or more hotspots is selected from the group consisting of advertisements, supplemental educational videos, web pages, chat services, video conferencing, one or more video feeds, and combinations thereof.

14. The computer system of claim 8, wherein the consumer insights and preferences can include, educational topic of interest to the user, particular object of interest to the user, other separate video footage associated with a video surveillance system that is of interest to the user and content of a video that is suitable to an age of the user.

15. A computer program product for dynamically generating interactive video content at an edge node of an edge network comprising:
one or more computer readable storage media having computer-readable program instructions stored on the one or more computer readable storage media, said program instructions executes a computer-implemented method comprising:
receiving, by a processor of the edge node, a set of incoming video frames;
identifying, by the processor, one or more hotspots within the incoming video frames to insert an interactive content, wherein each of the one or more hotspots are defined within a set of instructions including a timing within the incoming video frames and location within the incoming frames for inserting the interactive content;
selecting, by the processor, content from a repository configured to be inserted within the incoming video frames at each of the one or more hotspots defined by the set of instructions, wherein the content from selected from the repository is defined within the set of instructions;
selecting, by the processor, an interaction type defining within the set of instructions how the content is shown at each of the one or more hotspots;
executing, by the processor the set of instructions, altering the incoming video frames to an altered set of video frames containing the content selected that is configured to be presented to a user at each of the one or more hotspots using the interaction type defined within the set of instructions;
caching, by the processor, the altered video frames to an interactive content cache of the edge network;
outputting, by the processor the altered video frames to an end user device placed in communication with the edge network;
learning, by the processor, consumer insights and preferences of each user as a result of the user interactions with the interactive content outputted by the edge network to each corresponding user; and
in response to receiving incoming video frames by each corresponding user, applying, by the processor, the consumer insights and preferences of the corresponding user to influence hotspot identification, content selection and the interaction type or placement of the interactive content within the altered frames.

16. The computer program product of claim 15, further comprising:
in response to receiving a request to provide the incoming frames to a second end user device, searching, by the processor, the interactive content cache of the edge network for previously generated interactive content comprising the altered video frames;
fetching, by the processor, the altered frames from the interactive content cache of the edge network; and
outputting, by the processor, the set of altered frames from the edge network to the second user device.

17. The computer program product of claim 16, wherein, the request to provide the incoming frames to the second end user device is received by a second edge node of the edge network, and the altered frames stored by the interactive content cache is shared by the edge node with the second edge node of the edge network.

18. The computer program product of claim 15, wherein identifying the one or more hotspots further comprises:
detecting, by the processor, a set of one or more objects displayed within the incoming video frames; and
setting, by the processor, the timing and the location of the one or more hotspots as defined by the set of instructions to a time and location within the incoming frames where a detected object is displayed as part of the set of one or more objects within the incoming video frames.

19. The computer program product of claim 15, wherein identifying one or more hotspots further comprises:
converting, by the processor, speech-to-text of the incoming video frames;
detecting, by the processor, based on a conversion of speech-to-text of the incoming video frames, one or more concepts discussed within the incoming video frames; and
setting, by the processor, the timing and the location of the one or more hotspots as defined by the set of instructions to a time and location within the incoming frames where the one or more concepts is detected based on the conversion of the speech-to-text of the incoming video frames.

20. The computer program product of claim 15, wherein the consumer insights and preferences can include, educational topic of interest to the user, particular object of interest to the user, other separate video footage associated with a video surveillance system that is of interest to the user and content of a video that is suitable to an age of the user.

* * * * *